United States Patent
Botelho et al.

(10) Patent No.: US 9,430,164 B1
(45) Date of Patent: Aug. 30, 2016

(54) MEMORY EFFICIENT SANITIZATION OF A DEDUPLICATED STORAGE SYSTEM

(71) Applicant: EMC Corporation, Hopkinton, MA (US)

(72) Inventors: Fabiano C. Botelho, Sunnyvale, CA (US); Nitin Garg, Santa Clara, CA (US); Philip N. Shilane, Yardley, PA (US); Grant Wallace, Pennington, NJ (US)

(73) Assignee: EMC Corporation, Hopkinton, MA (US)

( * ) Notice: Subject to any disclaimer, the term of this patent is extended or adjusted under 35 U.S.C. 154(b) by 324 days.

(21) Appl. No.: 13/763,508

(22) Filed: Feb. 8, 2013

(51) Int. Cl.
*G06F 12/00* (2006.01)
*G06F 3/06* (2006.01)
*G06F 12/08* (2016.01)

(52) U.S. Cl.
CPC ......... *G06F 3/0655* (2013.01); *G06F 12/0862* (2013.01)

(58) Field of Classification Search
CPC ............... G06F 12/0862; G06F 9/383; G06F 2212/6028
USPC .......................................................... 711/137
See application file for complete search history.

(56) References Cited

U.S. PATENT DOCUMENTS

| | | | |
|---|---|---|---|
| 4,912,629 A | 3/1990 | Shuler, Jr. | |
| 6,105,040 A | 8/2000 | Agesen | |
| 6,253,215 B1 | 6/2001 | Agesen et al. | |
| 7,451,265 B2 * | 11/2008 | Traister et al. | 711/103 |
| 7,734,603 B1 | 6/2010 | McManis | |
| 7,783,683 B2 | 8/2010 | Sekiguchi | |
| 8,316,064 B2 | 11/2012 | Hsu | |
| 8,392,384 B1 * | 3/2013 | Wu et al. | 707/693 |
| 8,892,815 B2 | 11/2014 | Manohar et al. | |
| 2005/0166187 A1 | 7/2005 | Das et al. | |
| 2006/0074988 A1 | 4/2006 | Imanishi et al. | |
| 2006/0271538 A1 | 11/2006 | Mizrachi | |
| 2007/0043757 A1 | 2/2007 | Benton et al. | |
| 2007/0156967 A1 | 7/2007 | Bond et al. | |
| 2007/0203960 A1 | 8/2007 | Guo | |
| 2007/0271538 A1 | 11/2007 | Douady et al. | |
| 2008/0195680 A1 | 8/2008 | Daynes et al. | |

(Continued)

OTHER PUBLICATIONS

International Search Report and Written Opinion, Application No. PCT/US2009/054965, dated Mar. 2, 2010, 7 pages.

(Continued)

*Primary Examiner* — Charles Rones
*Assistant Examiner* — Nanci Wong
(74) *Attorney, Agent, or Firm* — Blakely, Sokoloff, Taylor & Zafman LLP

(57) ABSTRACT

Techniques for sanitizing a storage system are described herein. In one embodiment, for each file stored in the storage system, a list of fingerprints representing data chunks of the file is obtained. In such an embodiment, for each of the fingerprints, identifying a first container storing a data chunk corresponding to the fingerprint is identified, and determining a storage location of the first container in which the data chunk is stored is determined. In one embodiment, a bit in copy bit vector (CBV) is populated based on the identified container and the storage location. In one embodiment, after all of the bits corresponding to the data chunks of the first container have been populated in the CBV, data chunks represented by the CBV are copied from the first container to a second container, and records of the data chunks in the first container are erased.

21 Claims, 11 Drawing Sheets

(56) References Cited

U.S. PATENT DOCUMENTS

| | | | |
|---|---|---|---|
| 2009/0300080 A1* | 12/2009 | Stringham | 707/204 |
| 2010/0049735 A1 | 2/2010 | Hsu | |
| 2010/0088296 A1* | 4/2010 | Periyagaram et al. | 707/705 |
| 2011/0055471 A1* | 3/2011 | Thatcher et al. | 711/114 |
| 2011/0113214 A1* | 5/2011 | Accapadi | G06F 12/023 711/170 |
| 2011/0246741 A1* | 10/2011 | Raymond et al. | 711/170 |
| 2011/0264880 A1 | 10/2011 | Ylonen | |
| 2012/0159098 A1 | 6/2012 | Cheung et al. | |
| 2012/0233382 A1 | 9/2012 | Yamanaka et al. | |
| 2013/0246688 A1* | 9/2013 | Kanno et al. | 711/103 |
| 2014/0075095 A1* | 3/2014 | Manohar et al. | 711/103 |

OTHER PUBLICATIONS

International Preliminary Report on Patentability, Application No. PCT/US2009/054965, dated Mar. 10, 2011, 6 pages.

Botelho, Fabian C., et al., "Simple and Space Efficient Minimal Perfect Hash Functions", http://homepages.dcc.ufmg.br/~nivio/papers.wads07.pdf, Oct. 2007, 13 pages.

Zhu, Benjamin, et al., "Avoiding the Disk Bottleneck in the Data Domain Deduplication File System," In the Proceedings of the Fast '08: 6th USENIX Conference on File and Storage Technologies, Feb. 2008, pp. 269-282 (14 pages).

Belazzougui, D., et al., "Hash, Displace, and Compress," In Proceedings of the 17th Annual European Symposium on Algorithms, ESA'09, 2009, pp. 682-693.

Botelho, Fabian C., et al., "Minimal Perfect Hashing: A Competitive Method for Indexing Internal Memory," Information Sciences, 2011, pp. 181(2011):2608-2625.

Botelho, Fabian C., et al., "Practical Perfect Hashing in Nearly Optimal Space," Information Systems, Jun. 2012, http://dx.doi.org/10.1016/j.is.2012.06.002, May 19, 2012, 30 pages.

Dietzfelbinger, M. and Pagh, R., "Succinct Data Structures for Retrieval and Approximate Membership," In Proceedings of the 35th international colloquium on Automata, Languages and Programming, Part I, ICALP '08, Berlin, Heidelberg, 2008, Springer-Verlag, pp. 385-396.

Gutmann, P. "Secure Deletion of Data from Magnetic and Solid-State Memory," In Proceedings of the 6th conference on USENIX Security Symposium, Focusing on Cryptography, Jul. 1996, pp. 77-90 of the Proceedings, http://static.usenix.org/publications/library/proceedings/sec96/full_papers/gutmann/, (17 pages).

"A guide to understanding data remanence in automated information systems", http://www.cerberussystems.com/INFOSEC/stds/ncsctg25.htm, (May 2012), 18 pages.

"Evaluated Products List" National Security Agency Central Security Service, Degausser, (2012), 13 pages.

"U.S. National Industrial Security Program Operating Manual (DoD 5220.22-M)" US Department of Defense National Industrial Security Program, (2006), 129 pages.

Bender, et al., "Don't Thrash: How to Cache Your Hash on Flash", Proceedings of the 38th International Conference on Very Large Data Bases (VLDB), vol. 5, No. 11, (Aug. 27-31, 2012), 1627-37.

Bhagwat, et al., "Extreme Binning: Scalable, Parallel Deduplication for Chunk-based File Backup", Modeling, Analysis & Simulation of Computer and Telecommunication Systems, 2009. MASCOTS '09. IEEE International Symposium on, (Sep. 21-23, 2009), 9 pages.

Bloom, "Space/Time Trade-offs in Hash Coding with Allowable Errors", Communications of the ACM, vol. 13, No. 7, (Jul. 1970), pp. 422-426.

Broder, et al., "Network Applications of Bloom Filters: A Survey", Internet Mathematics vol. 1, No. 4 (2003, First available in Project Euclid: Feb. 23, 2005), http://projecteuclid.org/euclid.im/1109191032, pp. 485-509.

Clements, et al., "Decentralized Deduplication in SAN Cluster File Systems", USENIX ATC '09, https://www.usenix.org/conference/usenix-09/decentralized-deduplication-san-cluster-file-systems, (2009), 14 pages.

Deng, et al., "Metal-coated carbon nanotube tips for Magnetic Force Microscopy", American Institute of Physics, Applied Physics Letters vol. 85, No. 25, (Dec. 20, 2004), 14 pages.

Fredriksson, et al., "Simple Compression Code Supporting Random Access and Fast String Matching", In Proceedings of the 6th international conference on Experimental algorithms, WEA'07, Berlin, Heidelberg, Springer-Verlag, (2007), pp. 203-216.

Garfinkel, et al., "Remembrance of Data Passed: A Study of Disk Sanitization Practices", IEEE Security & Privacy, 1(1), (2003) pp. 17-27.

Guo, et al., "Building a High-performance Deduplication System", In Proceedings of the USENIX Annual Technical Conference, (2011), 14 pages.

Kissel, et al., "Guidelines for Media Sanitization", NIST Special Publication 800-88, Recommendations of the National Institute of Standaqrds and Technology, Computer Security Division, (Sep. 2006), 43 pages.

Lillibridge, et al., "Sparse Indesing: Large Scale, Inline Deduplication Using Sampling and Locality", In Proceedings of the 7th USENIX Conference on File and Storage Technologies, (2009), p. 111-123.

Rosenblum, et al., "The Design and Implementation of a Log-Structured File System", In Proceedings of the 13th Symposium on Operating Systems Principles, Published as Operating Systems Review, (1991) 15 pages.

Srinivasan, et al., "iDedup: Latency-aware, inline data deduplication for primary storage", In Proceedings of the 10th USENIX Conference on File and Storage Technologies, (2012), 14 pages.

Swanson, et al., "SAFE: Fast, Verifiable Sanitization for SSDs", http://nvsl.ucsd.edu/sanitize/, (2010), 5 pages.

Valli, et al., "A UK and Australian Study of Hard Disk Disposal", In 3rd Australian Computer, Information and Network Forensics Conference, (2005), 6 pages.

Vigna, "Broadword Implementation of Rank/Select Queries", In Proceedings of the 7th International conference on Experimental algorithms, WEA'08, Berlin, Heidelberg, 2008. Springer-Verlag, (2008), pp. 154-168.

Wallace, et al., "Characteristics of Backup Workloads in Production Systems", In Proceedings of the 10th USENIX Conference on File and Storage Technologies, (2012), 16 pages.

Wei, et al., "Reliably Erasing Data From Flash-Based Solid State Drives", In Proceedings of the 9th USENIX Conference on File and Storage Technologies, (Feb. 2011), 14 pages.

Final Office Action, U.S. Appl. No. 13/763,522, dated May 15, 2015, 22 pages.

* cited by examiner

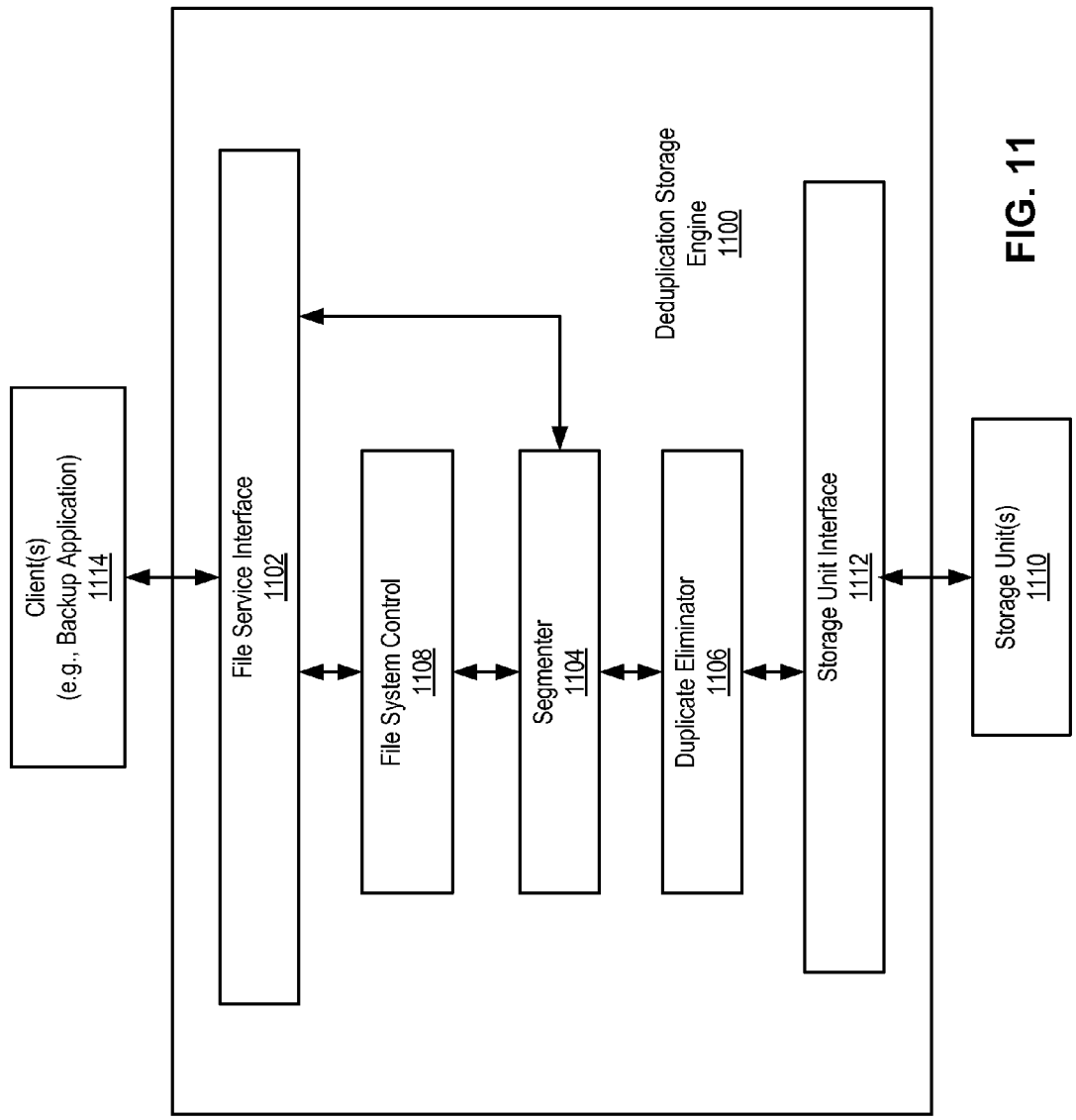

MEMORY EFFICIENT SANITIZATION OF A DEDUPLICATED STORAGE SYSTEM

FIELD OF THE INVENTION

Embodiments of the present invention relate generally to data storage systems. More particularly, embodiments of the invention relate to improving the efficiency of sanitizing a storage system.

BACKGROUND

Deleting data from a storage system is a routine and common operation. A regular file delete operation makes the file inaccessible via the namespace and frees the underlying data blocks for later reuse, but does not typically erase those blocks. This leaves behind a residual representation of the file that could be recovered. In many systems, merely overwriting the contents of the file first before deleting it will suffice. However, in systems that maintain old histories of objects (via snapshots or log-structured design for example), such a secure delete operation must be implemented with the involvement of the storage system. When disks are repurposed, residual data can often be accessed despite the intentions of the owners.

There are several commonly discussed examples of sensitive data being stored on an inappropriate system. A Classified Message Incident (CMI) happens when data at a particular classification level is written to storage not approved for that level of classification. A CMI might occur when a user inadvertently sends an email with "top secret" information to an email system approved for a lower clearance. Another CMI example is that information may be reclassified after it has been stored on a system with a low clearance. When a CMI occurs, the system administrator must take action to restore the system to a state as if the selected data had never been stored, which is how sanitization is defined. If a backup takes place before the CMI is rectified, then the backup server must also be sanitized.

Implementing a sanitization process must consider expected threats. Threats may be as simple as an attacker reading data with root access permissions or as complex as an attacker using laboratory equipment to read the storage media directly. Sanitizing for more complex threats will likely require greater costs either in terms of memory, I/O, or even hardware costs. Guidelines for threats and appropriate sanitization levels have been published by several government agencies, which require sanitization when purchasing storage. For example, the National Institute of Standards and Technology and U.S. Department of Defense have both published guidelines that define two levels of security for a sanitization process: (i) the clearing level, and (ii) the sanitization or purging level. The clearing level states that a single overwrite of the affected areas is enough to protect against casual attacks and robust keyboard attacks. The purging level states that the devices have to be either Degaussed or destroyed to protect against laboratory attacks.

Sanitizing a storage system has different problems to address than sanitizing a single device such as a hard drive that might be erased with a pattern of overwrites. For an in-place storage system, sanitizing an object (file, record, etc.) consists of following metadata references to the physical location within the storage system, overwriting the values one or more times, and erasing the metadata as well as other locations that have become unreferenced. Storage systems that are log-structured with large units of writes do not support in-place erasure of sub-units. Instead, such storage systems require copying forward live data and then erasing an earlier region.

A new complexity for sanitization is the growing popularity of deduplication. Deduplication reduces storage requirements by replacing redundant data with references to a unique copy. Data may be referenced by multiple objects, including live and dead (to be sanitized) objects. For these reasons, sanitization should be implemented within the storage system and not solely at a lower level such as the device. After all of the improperly stored data are deleted, the sanitization algorithm is manually started by a storage administrator. The technique is applied to the entire file system as opposed to individual files. Sanitizing individual files is as challenging as sanitizing the entire file system because of the need to track blocks that uniquely belongs to the files affected by the CMI. The tracking of references is the main problem to solve in order to efficiently sanitize a deduplicated storage system.

Another obstacle with sanitization is that, for large storage systems, there are multiple orders of magnitude less memory relative to storage because of cost differences, which leads to a new challenge for determining whether data is live or not. It is common for deduplicated storage to work with relatively small chunks of data so that duplicates can be identified, such as 4-8 KB average-sized chunks. These chunks tend to be identified with secure hash values such as SHA1, which is 160 bits in size, though other hash sizes are possible. For an 80 TB storage system with 8 KB chunks and 160 bit hashes, 200 GB of memory is required just for references, which is impractical.

BRIEF DESCRIPTION OF THE DRAWINGS

Embodiments of the invention are illustrated by way of example and not limitation in the figures of the accompanying drawings in which like references indicate similar elements.

FIG. 11 is a block diagram illustrating a deduplicated storage system according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
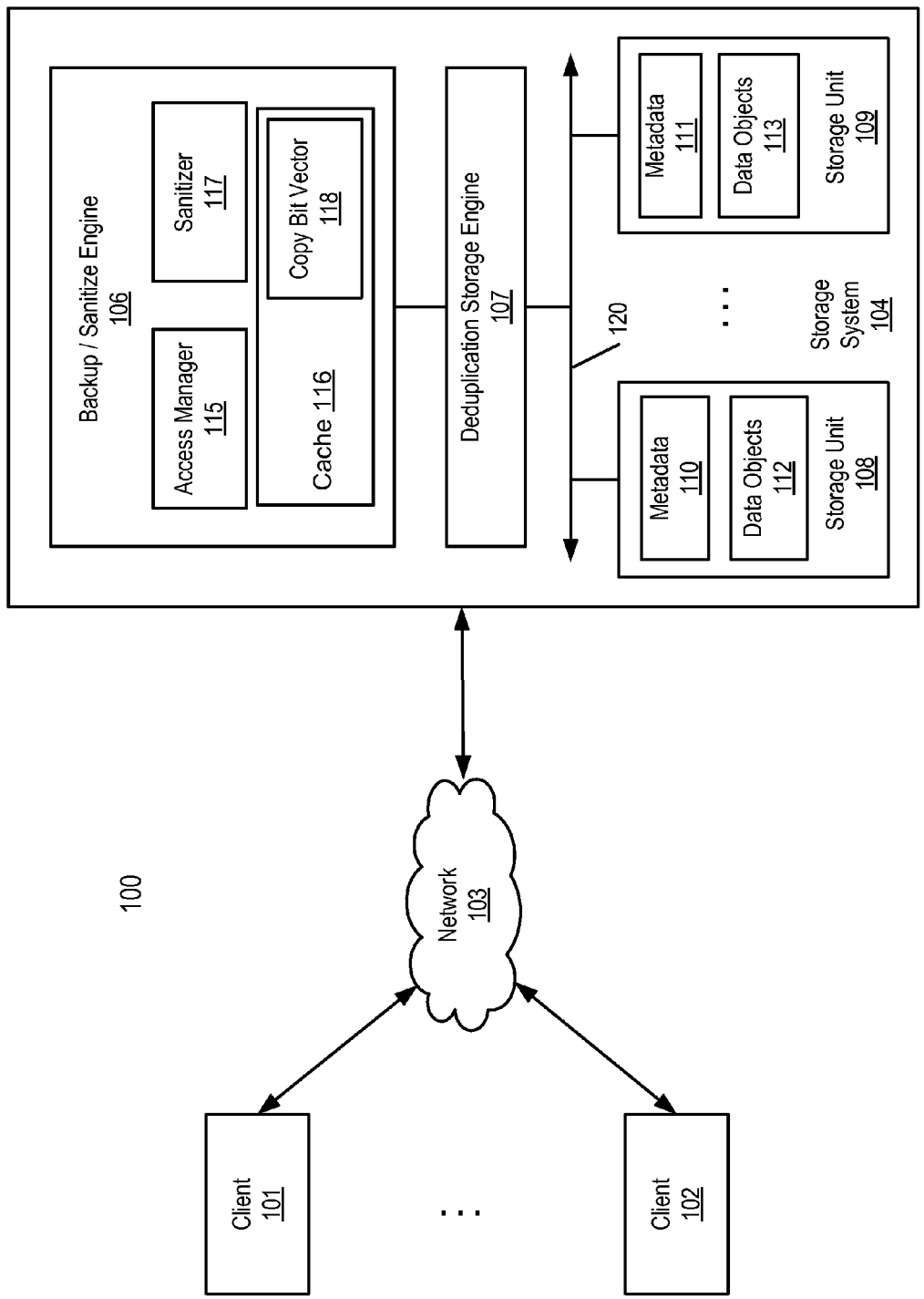
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different chunks may use different compression types (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a compression region (CR) of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored (e.g., a chunk location/entry within a container), reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system. In one embodiment, as the file ages, different compression techniques may be applied to the file.

Referring back to FIG. 1, according to one embodiment, backup engine 106 includes an access manager 115, cache 116, and sanitizer 117. Access manager 115 is to provide file services to a variety of clients, such as a backup/restore application, to restore files stored in storage units 108-109 or to backup files to storage units 108-109, in this example, represented as data objects 112-113 that may be deduplicated by deduplication storage engine 107. Typically, when a request is received to access a file such as a backup file, data objects of the requested file are loaded into a memory of storage system 104. Since the file may be large, only a portion of data objects of the file is loaded or cached in the memory at a time for accessing.

When a data chunk is being accessed, the data object containing the chunk is loaded into cache 116 and the request is then serviced using the data object from the cache. Cache 116 may be allocated as a designated memory region of the system memory, which is typically limited in size. When a data object is requested for access, access manager 115 inspects cache 116 to determine whether the requested data object is in cache 116. If so (e.g., cache hit), the data object from cache 116 is used to service the request. If the requested data object is not in cache 116 (e.g., cache miss), access manager 115 is to load the requested data object from storages 118-119 into cache 116. If cache 116 is full, a data object currently stored in cache 116 has to be evicted from cache 116 to make room for the data object currently requested. A data object may represent a data chunk, a CR of multiple data chunks, or a container of multiple CRs. According to one embodiment, multiple data objects, such as a CR or a container, may be read into the memory from storage units 108-109. However, only the related individual data chunks may be cached in cache 116.

According to one embodiment, sanitizer 117 is responsible for sanitizing the file system, e.g., by copying forward live data chunks from a first container to a second, and overwriting the first container with data patterns, such as 0's, 1's, or any data pattern that is predetermined or generated randomly. In one embodiment, the sanitizer copies forward data chunks from the first container to the second container according to information of a copy bit vector 118, which in one embodiment, is a data structure (e.g., an array) of bits, each bit corresponding to a data chunk stored in the file system. According to one aspect of the invention, each bit of the copy bit vector stores a bit value indicating whether the corresponding data chunk is live and needs to be copied forward. Details of sanitizer 117 will become apparent through the discussion of the various embodiments below.

Figure 2:
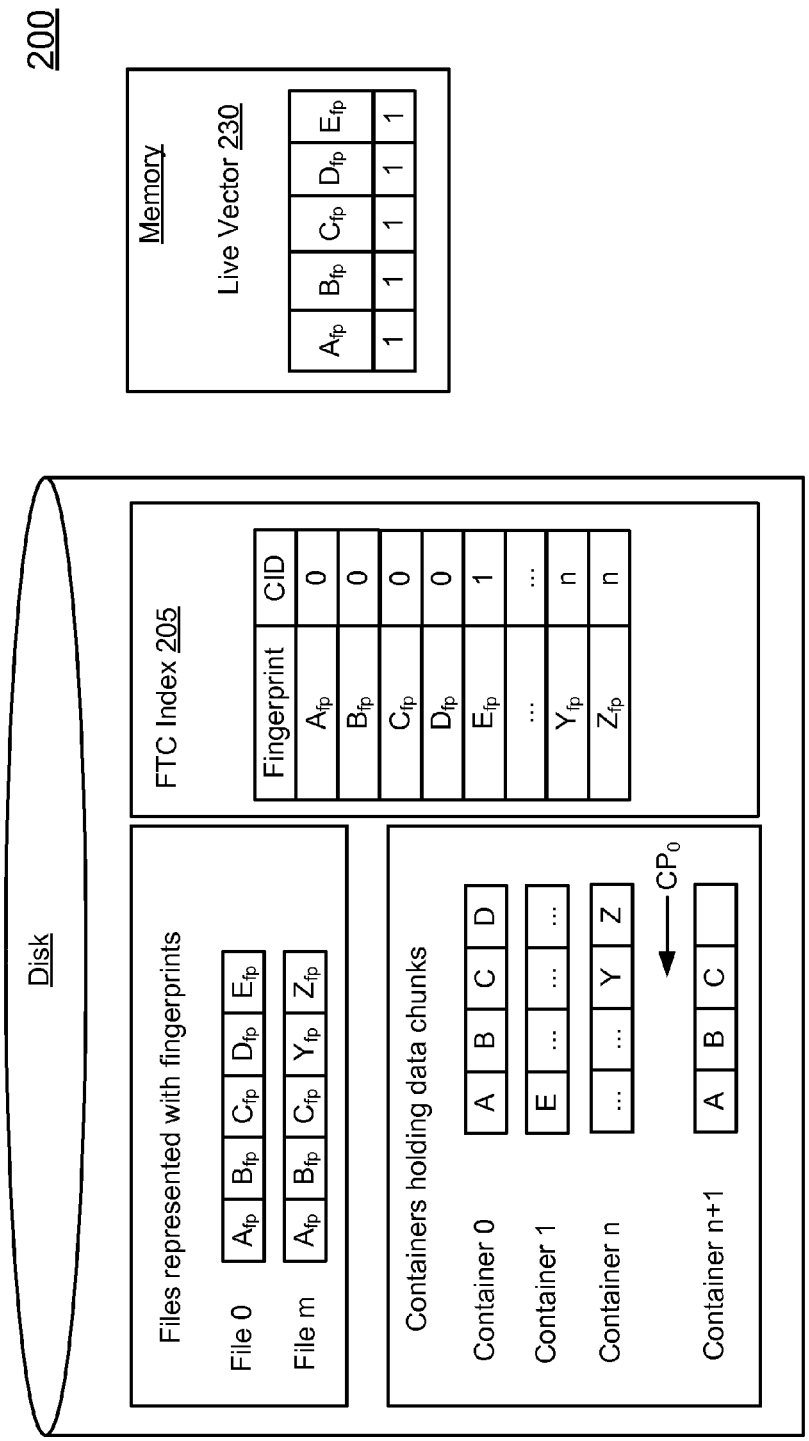
FIG. 2 is a block diagram illustrating a deduplicated storage system according to one embodiment of the invention.

FIG. 2 is a block diagram illustrating an embodiment of a deduplicated storage system according to one embodiment. Throughout the discussion of the various embodiments of the sanitization methods of the present invention, the focus will be on a deduplicated file system. However, it will be appreciated that the sanitization methods of the present invention are not so limited, and are equally applicable to any storage systems.

Referring now to FIG. 2, when a file is written to a storage system, such as system 200, it is partitioned into chunks that are the unit of deduplication. Chunks may be created with a fixed or variable size. In one embodiment utilizing variable-sized chunks, chunks have an average size of 8 KB. In one embodiment, a secure hash value is calculated over each chunk (e.g., SHA1), which shall herein be known as its fingerprint or chunk reference. In such an embodiment, the file written to the storage system is represented as a list of fingerprints (file recipe) that can be used to reconstruct the file, such as file 0 and file m of FIG. 2.

To perform deduplication, a fingerprint is compared against a fingerprint index, such as fingerprint-to-container (FTC) index 205, to determine whether it is duplicate or unique. If a fingerprint is a duplicate, then the current chunk does not need to be stored. If a fingerprint is unique, then the chunk is stored. Identifying duplicates leads to overall space savings for files. Unique chunks are further compressed, for example, by using GZ-like schemes, grouped together into 4.5 MB containers, such as container 0 through container n+1 shown in FIG. 2, and written out as a unit for efficient I/O. The containers in a storage system, according to one embodiment, are immutable and form the basis of the log-structured layout. The deduplication factor of a deduplicated storage system, which shall herein be referred to simply as factor D, is defined as (input bytes)/(post deduplication bytes). Deduplication factors larger than 1 indicate space savings. Savings from GZ compression of chunks is called "local compression". The combined effect of the deduplication and local compression is variously called total or overall compression or simply, compression.

As illustrated in FIG. 2, file 0 was written to an empty storage system, so all of its chunks were unique and were written sequentially to containers 0 and 1. File m was written later, and chunks A through C (represented by fingerprints $A_{fp}$ through $C_{fp}$, respectively) were duplicates. Chunks Y and Z correspond to modified regions of the file, and those chunks were written to container n. Continuing on with this example, suppose file 0 is deleted so that chunks D and E are unreferenced. For sanitization, it is necessary to erase D and E from storage. In embodiments of storage systems where containers are immutable, it is necessary to copy forward live chunks A, B, and C to a new container n+1 and overwrite containers 0 and 1 with zeros, ones, random data, or a specified pattern. This takes care of the need to move live chunks and overwrite their old, now free, locations.

Before running sanitization, a user deletes unwanted files, if any, from the storage system. Remaining files and their referenced chunks are referred to as live, and any unreferenced chunks are referred to as dead. One challenge for implementing sanitization within a deduplicated storage system is managing chunk references so that live chunks can be preserved and dead chunks erased while minimizing memory and I/O requirements.

Figure 3:
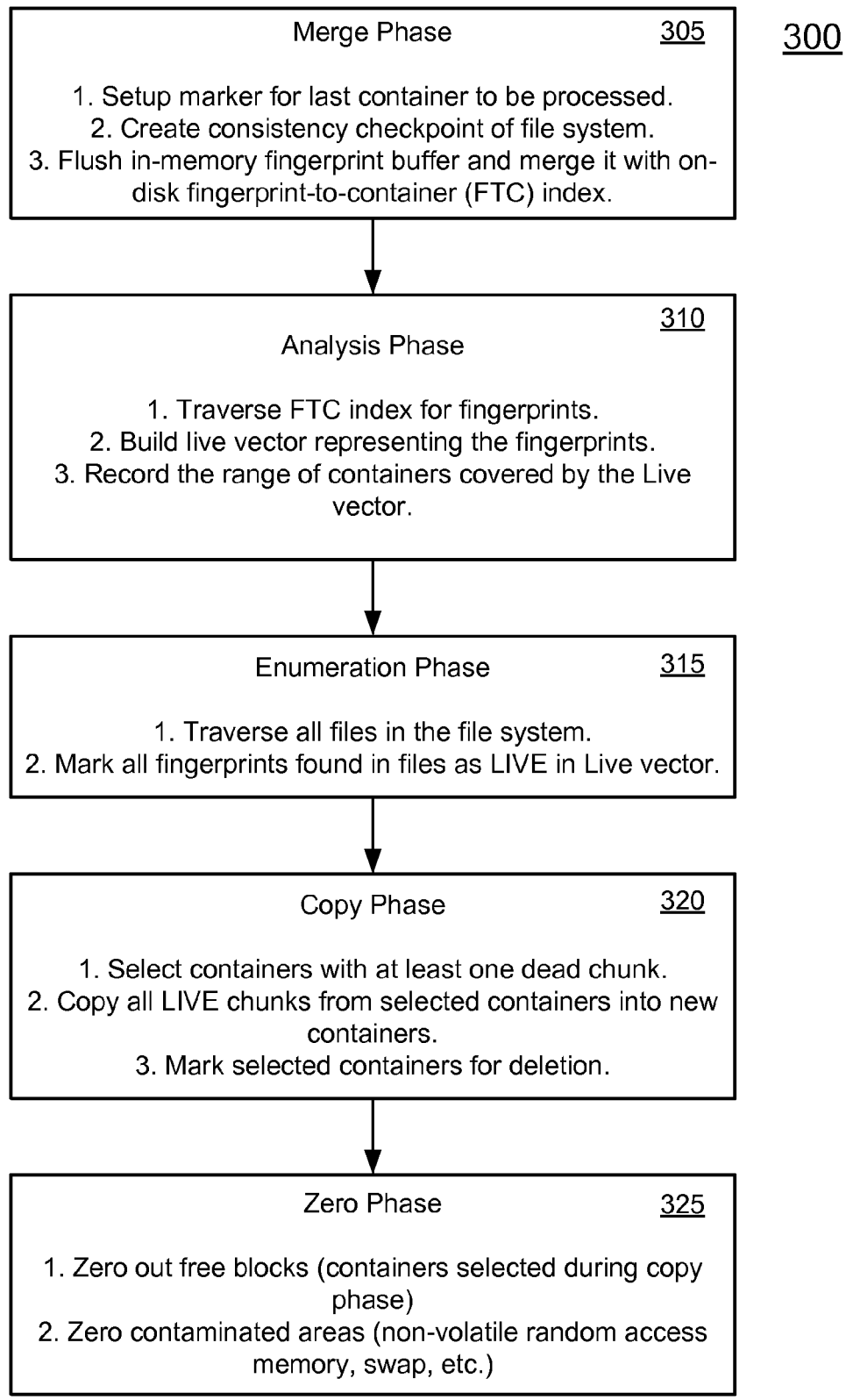
FIG. 3 is a flow diagram illustrating a method of sanitizing a storage system according to one embodiment of the invention.

FIG. 3 is a flow diagram illustrating a method 300 of sanitizing a storage system according to one embodiment of the invention. For example, method 300 may be performed by sanitizer 117 of FIG. 1. As discussed above, there are several levels of sanitization. There are some data that only require the clearing level and some that require the purging level. Embodiments of the sanitization process of the present invention comply with both levels with one common mechanism. The basic idea is to overwrite data to handle the clearing level. In one embodiment, the dead data chunks are overwritten with a pattern of zeros or ones. In another embodiment, the pattern is random. In yet another embodiment, the pattern is user-specified. If the purging level is required, in one embodiment, the clearing level is performed first, which compacts the clean data and allow the clean data to be efficiently migrated to another storage unit by replicating clean post-deduplication data rather than pre-deduplication data.

Referring now to FIG. 3, method 300 of sanitizing a file system comprises of five phases. During the merge phase at block 305, the sanitizer sets up a marker for the last container to be processed, which in one embodiment, is used as one of the stopping criteria for the copy phase (at block 320, discussed below). According to one embodiment, during the merge phase, the sanitizer creates a consistency check point of the file system (e.g., $CP_0$ of FIG. 2), which, according to one aspect of the invention, is an in-memory snapshot of the file system at the moment sanitization starts. In one embodiment, $CP_0$ is used to determine the subset of fingerprints that are used to generate a live vector, such as the perfect hash vector (discussed in further details below).

In one embodiment, during the merge phase, the sanitizer flushes an in-memory fingerprint-to-container (FTC) index so that it can be merged with an on-disk FTC index, such as FTC index 205 of FIG. 2. In one embodiment, FTC index 205 contains a mapping of fingerprint to container identifier (CID). For example, as illustrated in FIG. 2, fingerprint $A_{fp}$ maps to CID 0, i.e., container 0 contains the data chunk represented by fingerprint $A_{fp}$. According to one embodiment, "merging" of the indexes mean that the information in one index is mirrored in the other, for example, by copying the data.

During the analysis phase at block 310, the sanitizer reads (e.g., traverses/scans) the check-pointed on-disk FTC index for fingerprints, and builds a data representation, such as vector 230 of FIG. 2, to represent the fingerprints. In one embodiment, the vector is a perfect hash vector ($PH_{vec}$). Perfect hashing is a known technique for minimizing the number of bits needed to represent a mapping from a fixed set of keys to a value. In the context of file system sanitization, fingerprints identifying the data chunks are the keys.

According to one embodiment, a vector data structure such as a Perfect Hash Vector Data Structure, or simply $PH_{vec}$, is used to compactly represent a static set of fingerprints, also referred to as a live vector. We denote $[m]=\{0, 1, \ldots, m-1\}$. The data structure has two components: (i) a hash function such as a Perfect Hash Function (PHF), i.e., a collision free hash function ph: S→[m] that is specifically computed for an input fingerprint set S of size n and maps S into m buckets (i.e., subsets of fingerprints in set S), where m=cn for c>1; (ii) a bit vector indexed by the perfect hash function. We denote $|PH_{vec}|$ as the size in bits of the data structure and |ph| as the number of bits to represent the perfect hash function. Hence, $$|PH_{vec}|=|ph|+m \text{ bits.}$$

In one embodiment, a $PH_{vec}$ structure is created with a payload that ranges from 2.54 to 2.87 bits per fingerprint. In one embodiment, the perfect hash algorithm consists of two levels. A "first level hash function" g maps S into [r], and thus splits S into r "buckets" (i.e., a bucket is a subset of the fingerprints in set S):

$$B_i=\{x \; S|g(x)=i\}, 0 \leq i < r.$$

We let r=n/λ, where λ≥1. For each bucket i, there is a second level hash function mapping to bins within a range of size m, i.e., $h_i$: S→[m]:

$$h_i(x)=(f_1(x)+d_0 f_2(x)+d_1) \bmod m,$$

where $f_1$: S→[m] and $f_2$: S→[m] as well as function g are assumed to be fully random hash functions. The resulting PHF ph: S→[m] has the following form:

$$ph(x)=h_{g(x)}(x).$$

Function g will map each key to one of the r buckets. Then, for each bucket $B_i$, a pair of displacements $(d_0, d_1)$ are assigned so that each key x $B_i$ is placed in an empty bin given by $h_i(x)$. For each bucket $B_i$ different pairs of $(d_0, d_1)$ will be tried until one them successfully places all keys in $B_i$. In each trial, a pair of $(d_0, d_1)$ is selected from a sequence $\{(0, 0), (0, 1), \ldots, (0, m-1), (1, 0), (1, 1), \ldots (1, m-1), \ldots, (m-1, m-1)\}$. Instead of storing a pair of $(d_0, d_1)$ for each bucket $B_i$, the index of the first pair in the sequence that successfully places all keys in $B_i$ is stored, i.e., d(i). The data structure only has to store the sequence $\{d(i)|0 \leq i<r\}$, and make sure that d(i) can be retrieved in O(1) time. Thus, according to one embodiment, the perfect hashing algorithm to generate the PHFs can be summarized as follows:

(1) Split S into buckets $B_i=\{x \; S|g(x)=i\}$, $0 \leq i<r$;
(2) Sort buckets $B_i$ in falling order according to size $|B_i|$;
(3) Initialize array T [0 . . . m−1] with all 0's.
(4) For all i [r], in the order from (2), do
(5) For l=0, 1, . . . repeat forming $K_i=\{h_i(x) \; x \; B_i\}$
(6) until $|K_i|=|B_i|$ and $K_i \cap \{j|T[j]=1\}=0$;
(7) let d(i)=the successful l;
(8) for all j $K_i$ let T[j]=1;
(9) Compress (d(i)) $0 \leq i<r$ and retain O(1) access.

Creating a $PH_{vec}$ is complicated because the vector representing all fingerprints stored in the on-disk FTC index may not fit in internal memory. Thus, in some embodiments, it is necessary to partition the FTC index into smaller PH buckets and then creating a $PH_{vec}$ for each bucket using a perfect hash function that was created based on the fingerprints of the corresponding bucket. In one embodiment, the assignment of fingerprints to PH buckets is accomplished by applying a hash function on the fingerprint and using the hash value to select a bucket. Thus, for example, in FIG. 2, fingerprints for data chunks A through E may be assigned to one bucket and corresponding live vector, while fingerprints corresponding to data chunks F through J may be assigned to a second bucket and second corresponding live vector, etc. In one embodiment, an offset table contains pointers that mark the beginning of each bucket in memory so that direct access to its $PH_{vec}$ structure may be achieved.

Referring still to FIG. 3. During the analysis phase at block 310, the sanitizer records the range of containers that is covered by the $PH_{vec}$. In one embodiment, the range of containers is recorded as the FTC index is being read/scanned to build the $PH_{vec}$. For example, while scanning the index, the sanitizer may maintain a variable MAX_CID. As each fingerprint is scanned, the sanitizer determines if the corresponding CID of the current fingerprint is greater than the MAX_CID, and if so, updates MAX_CID with the current CID. Similarly, while the sanitizer scans the FTC index, it may maintain a MIN_CID variable to keep track of the lowest container being processed. In one embodiment, this range of containers is used during the copy phase to ensure that only containers within this range are processed.

During the enumeration phase at block 315, the sanitizer reads (e.g., traverses/scans) all the files in the entire file system, e.g., file 0 and file m of FIG. 2. For each of the fingerprints associated with a file, the sanitizer determines the corresponding bucket that the fingerprint belongs to, for example, by applying a first hash function to the fingerprint, and using the resulting hash value to select the corresponding bucket. In one embodiment, the sanitizer applies a second hash function (e.g., collision-free hash function such as a perfect hash function) which was built based on the fingerprints of the corresponding bucket to the fingerprint. The resulting hash value serves as an index into a vector (e.g., a perfect hash vector) of the associated bucket. According to one aspect of the invention, once the corresponding location of the fingerprint in the vector is determined, a predetermined value is written to the location to indicate that the data chunk represented by the fingerprint is live. For example, the location may be a single bit wide, and it may be set to a value of "1" to indicate the data chunk is live.

Referring now to FIG. 3. During the copy phase at block 320, the sanitizer reads the metadata of each container within the range of containers recorded during the analysis phase, such as containers 0 through n of FIG. 2, and for each fingerprint found in the metadata, it looks up the live vector, e.g., live vector 230 of FIG. 2, to check its liveness. In one embodiment, for each data chunk contained in a container, the metadata includes the fingerprint representing the data chunk, the container ID (CID) identifying the container that contains the data chunk, and the chunk identifier (ID) identifying the location within the container which contains the chunk. In one embodiment, some or all of the above operations may be performed once for each PH bucket.

During the copy phase, in one embodiment, if a container contains at least one dead data chunk, it is selected to be copied and marked for deletion. In such an embodiment, all live data chunks of selected containers are copied to one or more new containers, and the selected containers are deleted and freed/returned/released to a pool of free containers for reuse. By way of example, supposed that after file 0 and file m have been written to the file system as illustrated in FIG. 2, the user decides to delete file 0. As illustrated in FIG. 2, fingerprints $A_{fp}$, $B_{fp}$, $C_{fp}$, $D_{fp}$, and $E_{fp}$ of file 0 were written to container 0 and container 1. However, fingerprints $A_{fp}$, $B_{fp}$, $C_{fp}$ are also referenced by file m. As a result, during the enumeration phase at block 315, the sanitizer sets the live status bits corresponding to fingerprints $A_{fp}$, $B_{fp}$, and $C_{fp}$ to "1" to indicate they are live because these fingerprints are also referenced by file m, which has not been deleted by the user. The live status bits corresponding to fingerprints $D_{fp}$ and $E_{fp}$, however, remain set to their default/initialized value of "0", indicating that they are dead chunks. During the copy phase at block 320, the sanitizer will select container 0 and container 1 to be copied and mark them for deletion because they each contain at least one dead chunk (container 0 contains dead chunk D, and container 1 contains dead chunk E). Continuing on with the example, during the copy phase, the sanitizer will copy fingerprints $A_{fp}$, $B_{fp}$, and $C_{fp}$ to a new container, for example, container n+1 as shown in FIG. 2.

During the zero phase at block 325, the sanitizer overwrites the free blocks (e.g., containers selected during the copy phase) with patterns of data, which may be zeros, ones, user-defined pattern, random data, or any combination thereof. According to one aspect of the invention, during the zero phase, the sanitizer also overwrites potentially contaminated areas, e.g., non-volatile random access memory, swap partition, core dumps, etc. In one embodiment, if a freed container is re-utilized during the same sanitization cycle, the entire container will be fully written out by the file system and padded with zeros.

Although FIG. 3 illustrates the sanitization process as a series of phases, it will be appreciated that some or all of the phases may be performed in parallel. For example, some or all of the operations of the copy phase may overlap with some or all of the operations of the zero phase. It will be further appreciated that the operations of method 300 may be performed by one or more sets of logic within the sanitizer, which may be implemented in hardware, software, firmware, or any combination thereof.

The above discussion of the sanitization process may assume the storage system is read-only, i.e., during the sanitization process, the storage system is off-line. Removing the read-only restriction breaks the perfect knowledge that exists with the key space that is assumed in the above discussion.

In order to leverage the compactness of perfect hashing, a technique to freeze the key space is required. Not only that, due to deduplication, an incoming chunk may revive a dead but not yet erased copy of that chunk after enumeration is done. Hence, a method to capture the resurrected chunk in the $PH_{vec}$ structure is needed so as to not corrupt the file system.

In one embodiment, the enumeration phase discussed above is modified in order to support read-write mode during sanitization. There are two problems to be addressed: (i) How will the $PH_{vec}$ structure be updated for the incoming fingerprints? (ii) How will the $PH_{vec}$ structure be updated to account for fingerprints that came in after $CP_0$ has been taken but before the $PH_{vec}$ structure was constructed?

To address the first problem, at the beginning of the enumeration phase, a "notify mechanism" will be set up. For every incoming chunk that is deduplicated, the sanitizer will be notified with the pair {fingerprint, CID}. The sanitization process is not affected by new fingerprints (e.g., non-deduped), because at the beginning of the merge phase, the head of the log-structured container set is snapshotted so the current cycle of the sanitization process will not touch any container after that marker: any new data written during current sanitization that itself becomes eligible for sanitization has to be dealt with by the next sanitization operation.

According to this embodiment, by using the notified CID, the sanitizer is able to check whether the notified fingerprint belongs to the key space used to build the $PH_{vec}$ structure for each bucket (i.e., whether the notified fingerprint is represented by any of the previously built $PH_{vec}$). If it does, the sanitizer can safely record that the notified fingerprint is alive, by setting the live status bit in the $PH_{vec}$ corresponding to the fingerprint to indicate the chunk is live. In one embodiment, if the notified fingerprint is not represented by a $PH_{vec}$, the sanitizer simply ignores the fingerprint, which shall be processed during the next sanitization cycle/process.

To address the second problem, according to one embodiment, a second consistency point, for example, $CP_1$, of the file system is taken after the $PH_{vec}$ is constructed and the notify mechanism is set up. Note that, in this embodiment, the sanitization process is operating on two in-memory snapshots ($CP_0$ and $CP_1$) and the new writes will not modify them. According to one aspect of the invention, the sanitizer is capable of "diffing" $CP_0$ and $CP_1$ to find the modified files in $CP_1$ relative to $CP_0$. The main concern here is that there is no guarantee that all the fingerprints coming from the modified files belong to the key space used to build the $PH_{vec}$, whereas that is guaranteed for all the fingerprints coming from files in $CP_0$. Let $F_0$ and $F_1$ be the set of fingerprints coming from files in $CP_0$ and from the modified files in $CP_1$, respectively. Hence, for each fingerprint f $F_1$, it is necessary to determine the container storing f before the $PH_{vec}$ that f maps to can be updated. That is an expensive operation that requires on-disk index lookups. Thus, in some embodiments it is desirable to make $F_1$ as small as possible.

To address the second problem raised above, it is further necessary to perform the enumeration in two steps. The first step will traverse all the modified files in $CP_1$ and carry out on-disk index lookups for all the fingerprints in $F_1$ before updating the corresponding $PH_{vec}$ structure. The second step will traverse all the files in $CP_0$ and update the corresponding $PH_{vec}$ structure for all fingerprints in $F_0$.

In some embodiments, the memory available in a storage system may not be sufficient to enumerate all fingerprints in one pass, for example, the entire live vector for all fingerprints in the system is too large to fit in the available memory. In such embodiments, it may be necessary to perform sanitization in multiple iterations, each iteration enumerating only a subset of the fingerprints in the index (e.g., by partitioning the index into buckets of fingerprints as discussed above). During the copy phase, if a fingerprint found in the metadata of a container maps outside the range fingerprints covered by the current iteration (i.e., the fingerprint is not in the bucket for which the hash function of the current iteration has been created), the corresponding data chunk is assumed/considered alive in that iteration. According to this embodiment, if the fingerprint assumed to be live, in fact, identifies a dead chunk, it will be deleted on the following iterations. This is problematic because potentially the sanitization process may need to copy all the containers in the system multiple times. Each copy will force zeroing out the container as well, which is I/O intensive.

Figure 4:
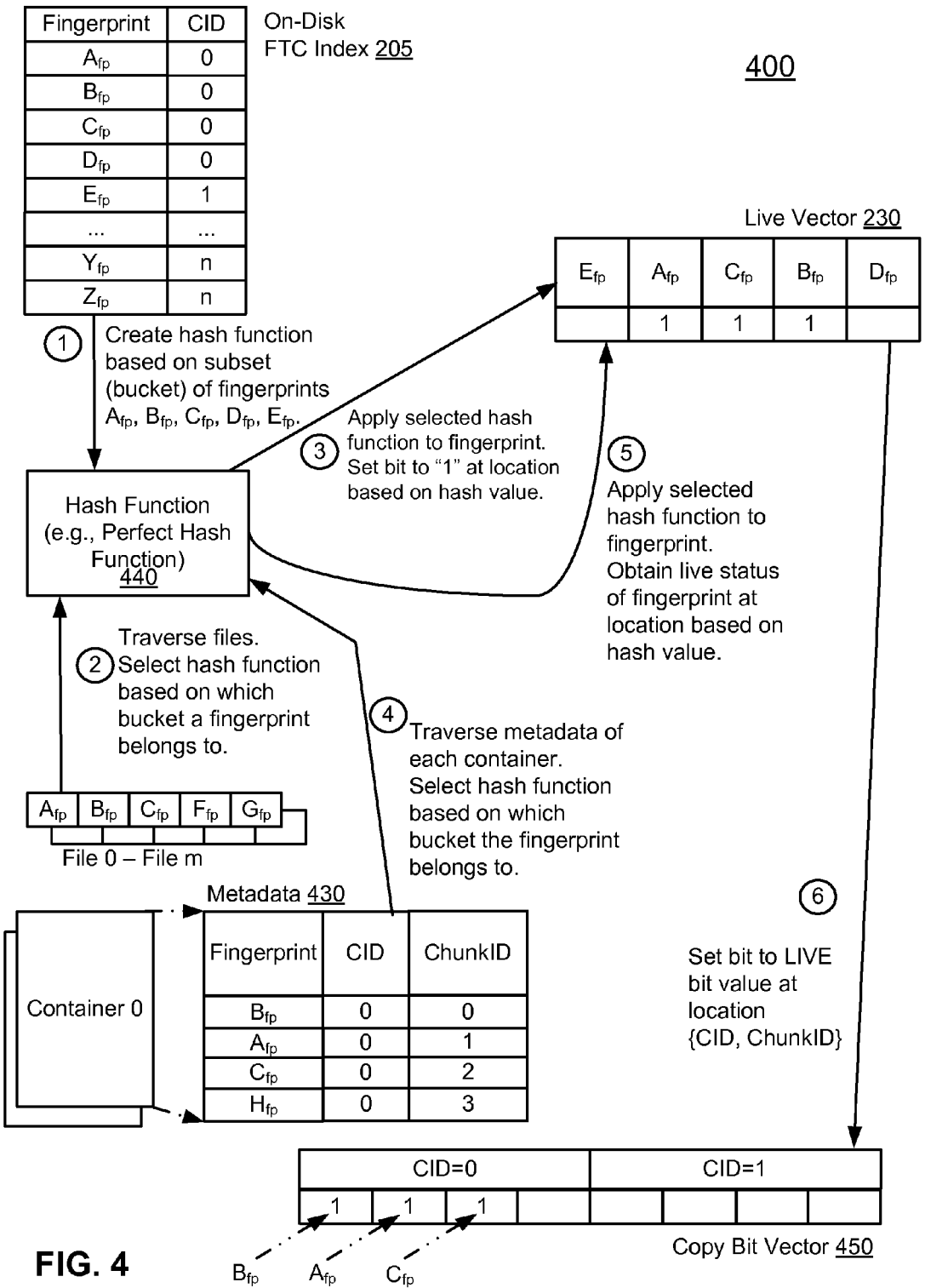
FIG. 4 is a processing diagram illustrating a method of sanitizing a storage system according to one embodiment of the invention.

FIG. 4 is a processing diagram illustrating a method 400 of sanitizing a file system according to one embodiment of the invention. For example, method 400 may be performed by sanitizer 117 of FIG. 1. Method 400 minimizes the number of copy forward operations on the containers by building a copy bit vector (CBV). At operation 1, which in one embodiment, may be implemented as part of the analysis phase discussed in the text relating to FIG. 2 above, the sanitizer partitions the fingerprints in the file system into subsets of fingerprints, e.g., by assigning fingerprints into one of several buckets. In one embodiment, the assignment of a fingerprint to a bucket is accomplished by applying a hash function on the fingerprint and using the hash value to select a bucket that the fingerprint should be assigned to. In one embodiment, at operation 1, the sanitizer creates a corresponding hash function for each of the bucket that is created. Thus, for example, as illustrated in FIG. 4, fingerprints $A_{fp}$, $B_{fp}$, $C_{fp}$, $D_{fp}$, and $E_{fp}$ have been assigned to the same bucket, and hash function 440 is created using the bucket. Note that although FIG. 4 only illustrates a single hash function and single live vector, it will be appreciated that multiple hash functions and live vectors may be built during operation 1. For example, the sanitizer may build, for each bucket, a hash function (such as a perfect hash function), thus, resulting in a live vector for each of the corresponding bucket.

At operation 2, which in one embodiment, may be implemented as part of the enumeration phase discussed in the text relating to FIG. 2 above, the sanitizer traverses (e.g., by reading or scanning) the files (such as file 0 and file m) of the file system containing the fingerprints. For each fingerprint found in a file, the sanitizer determines which bucket it belongs to, e.g., by applying a hash function (e.g., a first hash function) to the fingerprint and using the resulting hash value to identify the bucket that the fingerprint belongs to. According to one embodiment, once the bucket has been identified, the collision-free hash function (e.g., a second hash function such as the perfect hash function) corresponding to the identified bucket is selected. Continuing on with the above example, as illustrated in FIG. 4, the sanitizer selects hash function 440 for fingerprints $A_{fp}$, $B_{fp}$, $C_{fp}$ because it corresponds to the bucket that contains these fingerprints. In one embodiment, a different hash function would be applied by the sanitizer to fingerprints $F_{fp}$ and $G_{fp}$ because these two fingerprints are not represented by hash function 440, i.e., they do not belong to the bucket which corresponds to hash function 440.

At operation 3, which in one embodiment, may be implemented as part of the enumeration phase discussed in the text relating to FIG. 2 above, once a bucket of the fingerprint has been identified and the corresponding hash function is selected, the sanitizer applies the selected hash function to the fingerprint. The hash value is then used as an index/reference that points to a bit in a live vector that corresponds to the selected hash function. Continuing on with the example, live vector 230 corresponds to hash function 440, and its bits are referenced by hash values that result from the application of hash function 440.

In one embodiment, the live vector is initialized at the start of a sanitization process with all "0's", thus, defaulting all chunks to dead status. In one embodiment, the live vector bit referenced by the hash value is set to a predetermined value, e.g., logical "1" or TRUE, to indicate the data chunk represented by the fingerprint is live. Continuing on with the example, as illustrated in FIG. 4, the sanitizer applies hash function 440 to fingerprints $A_{fp}$, $B_{fp}$, and $C_{fp}$, as discussed above and obtains the hash values of {1, 3, 2}, respectively. As a result, the sanitizer sets the bits of live vector 230 at position {1, 3, 2} to "1", indicating that fingerprints $A_{fp}$, $B_{fp}$, $C_{fp}$ are live, respectively. With respect to fingerprints $F_{fp}$ and $G_{fp}$, in one embodiment, a different hash function (not shown) would be applied to the two fingerprints, and the resulting hash values would reference a different live vector (not shown).

In one embodiment, operations 2 and 3 are repeated until all fingerprints in all files in the file system have been enumerated. For example, even in an embodiment where only one live vector (representing a subset of the fingerprints in the system) is built in each iteration, all files in the system are still enumerated during each iteration. Note, however, that in such an embodiment, not all fingerprints will affect the live vector of a given iteration because some fingerprints may fall outside the range of fingerprints covered by the bucket of the current iteration.

At operation 4, which in one embodiment, may be performed prior to the copy phase discussed in the text relating to FIG. 2 above, the sanitizer reads (e.g., scans/traverses) all the metadata of all the check-pointed containers in the file system. In one embodiment, for each fingerprint found in the metadata, the sanitizer determines which bucket the fingerprint belongs to, e.g., by applying a hash function as described above in the text relating to operation 2. In one embodiment, a hash function corresponding to the identified bucket is selected by the sanitizer. Continuing on with the example, as illustrated in FIG. 4, the sanitizer selects hash function 440 for fingerprints $B_{fp}$, $A_{fp}$, and $C_{fp}$ of metadata 430 because hash function 440 corresponds to the bucket which these three fingerprints belong to. In one embodiment, a different hash function (not shown) is selected for fingerprint $H_{fp}$ because it does not belong to the bucket corresponding to hash function 440.

In one embodiment, the metadata of each container includes the fingerprints of all the data chunks stored in the container, and their corresponding CIDs and chunk IDs. For example, as illustrated in FIG. 4, container 0 includes metadata 430, which includes fingerprints $B_{fp}$, $A_{fp}$, $C_{fp}$, and $H_{fp}$, representing data chunks B, A, C, and H, respectively, each having the CID value of 0 to identify container 0 as the container which stores the chunks. Moreover, metadata 430 includes chunk IDs indicating data chunks B, A, C, and H are stored at chunk locations 0, 1, 2, and 3, respectively (as indicated by chunk ID=0, 1, 2, 3, respectively).

In one embodiment, all containers that fall within the range of containers recorded as part of the analysis phase (as discussed in the text relating to block 310 of FIG. 3) are processed. For example, even in an embodiment where only one live vector (representing a subset of the fingerprints in the system) is built in each iteration, all containers within the recorded range may still be enumerated during each iteration. Note, however, that in such an embodiment, not all fingerprints found in the metadata of the containers will affect the copy bit vector of a given iteration because some fingerprints may fall outside the range of fingerprints covered by the bucket of the current iteration.

At operation 5, which in one embodiment, may be performed prior to the copy phase discussed in the text relating to FIG. 2 above, once a bucket of the fingerprint in the metadata has been identified and the corresponding hash function is selected, the sanitizer applies the selected hash function to the fingerprints. The hash value is then used as an index/reference that points to a bit in a live vector that corresponds to the selected hash function. Continuing on with the example, as illustrated in FIG. 4, the sanitizer applies hash function 440 to fingerprints $B_{fp}$, $A_{fp}$, and $C_{fp}$ and obtains the hash values of {3, 1, 2}, respectively. As a result, the sanitizer obtains the live status of fingerprints $B_{fp}$, $A_{fp}$, and $C_{fp}$ from live vector 230 at positions {3, 1, 2}, respectively. With respect to fingerprint $H_{fp}$ of metadata 430, in one embodiment, a different hash function (not shown) would be applied to the fingerprint, and the resulting hash value would reference a different live vector (not shown). In some embodiments, the hash function for fingerprint $H_{fp}$ may be created on a different iteration, e.g., if there is insufficient memory to store all hash functions and live vectors in the current iteration. According to one embodment, hash function 440 is a perfect hash function, and live vector 230 is a perfect hash vector.

At operation 6, which in one embodiment, may be performed prior to the copy phase discussed in the text relating to FIG. 2 above, the sanitizer sets a bit in copy bit vector (CBV) 450 to the live status obtained during operation 5. In one embodiment, the bit in CBV 450 which is affected is the bit corresponding to the CID and chunk ID of the fingerprint (which may be obtained by the sanitizer from the metadata during operation 4). In one embodiment, CBV 450 may be implemented as a data structure (such as an array of bits), such that each bit represents the live status of a corresponding data chunk. In one embodiment, each bit is referenced by a pair of {CID, chunk ID} of the fingerprint that the bit represents. In one embodiment, the pair is mapped to the CBV bit by looking up a table preconfigured in memory. In such an embodiment, the table contains a listing/mapping of each CID to a memory address corresponding to the starting location of the container identified by the CID. The chunk ID is then used as an offset from the starting location to determine the CBV bit corresponding to the pair {CID, chunk ID}. Continuing on with the example, as illustrated in FIG. 4, the bits of CBV 450 at position {0, 1, 2} corresponds to chunk 0, 1, and 2 of container 0, respectively. Thus, at operation 6, the sanitizer sets the bits of CBV 450 at positions {0, 1, 2} based on the values of the bits of live vector 230 at positions {3, 1, 2}, respectively, to indicate the live status of data chunks represented by fingerprints $B_{fp}$, $A_{fp}$, and $C_{fp}$, respectively.

In one embodiment, once CBV 450 has been completely built, operations similar to those of the copy phase and zero phase discussed above are performed to complete the sanitization process. For example, the copy phase may stream the bits of CBV 450 from disk into memory, and process corresponding containers for copying forward live chunks. In one embodiment, the corresponding containers may be processed, for example, by selecting containers with at least one dead chunk to be copied. For such selected containers, the sanitizer copies all live chunks to new containers, and the selected containers are marked for deletion. The marked containers are overwritten using similar operations as those discussed in the text relating to the zero phase above.

Figure 5:
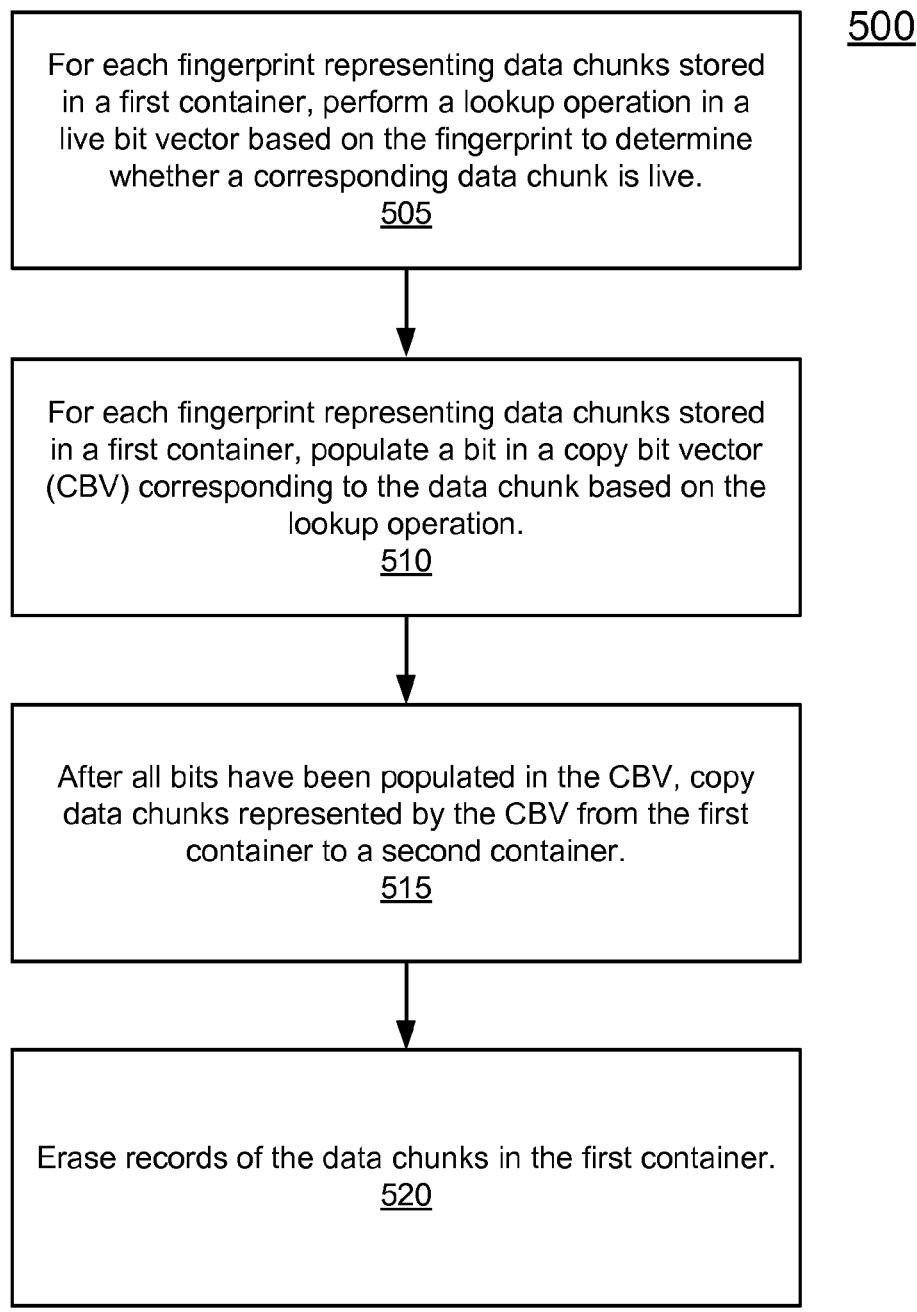
FIG. 5 is a flow diagram illustrating a method of sanitizing a storage system according to one embodiment of the invention.

FIG. 5 is a flow diagram illustrating a method 500 of sanitizing a file system according to one embodiment of the invention. For example, method 500 may be performed by sanitizer 117 of FIG. 1. Referring now to FIG. 5, at block 505, for each of fingerprints representing data chunks stored in a first of a plurality of containers of the storage system, the sanitizer performs a lookup operation in a live bit vector based on the fingerprint to determine whether a corresponding data chunk is live. For example, the sanitizer performs operations similar to operations 1 through 5 of method 400 illustrated in FIG. 4 as described above. In one embodiment, the live bit vector, such as live vector 230 of FIG. 4, includes a plurality of bits and each indicating whether one of a plurality of data chunks stored in the plurality of containers is live.

At block 510, for each of fingerprints representing data chunks stored in a first of a plurality of containers of the storage system, the sanitizer populates a bit in a copy bit vector corresponding to the data chunk based on the lookup operation. For example, the sanitizer may perform operation 6 of method 400 illustrated in FIG. 4 as described above. In one embodiment, the copy bit vector, such as CBV 450 of FIG. 4, includes a plurality of bits and each storing a bit value indicating whether a data chunk is to be copied.

At block 515, after all the bits corresponding to the data chunks of the first container have been populated in the CBV, the sanitizer copies data chunks represented by the CBV from the first container to a second container. For example, the sanitizer may perform the operations of the copy phase as described above in the text relating to block 320 of FIG. 3. At block 520, the sanitizer erases records of the data chunks in the first container. For example, the sanitizer performs the operations of the zero phase as described above in the text relating to block 325 of FIG. 3.

Often times, files written to the storage system are highly fragmented, especially in a deduplicated storage system. For example, imagine a file containing ten data chunks, and each of the data chunk is stored in a different container. In such a scenario, in order to determine the location of a data chunk, the metadata of each of the ten containers must be read. However, there are cases where files are written to the storage system in such a manner that fragmentation is very low, that is, multiple data chunks of each file are located in the same container. Under such a scenario, it is possible to create CBVs leveraging off the locality of these data chunks.

Figure 6:
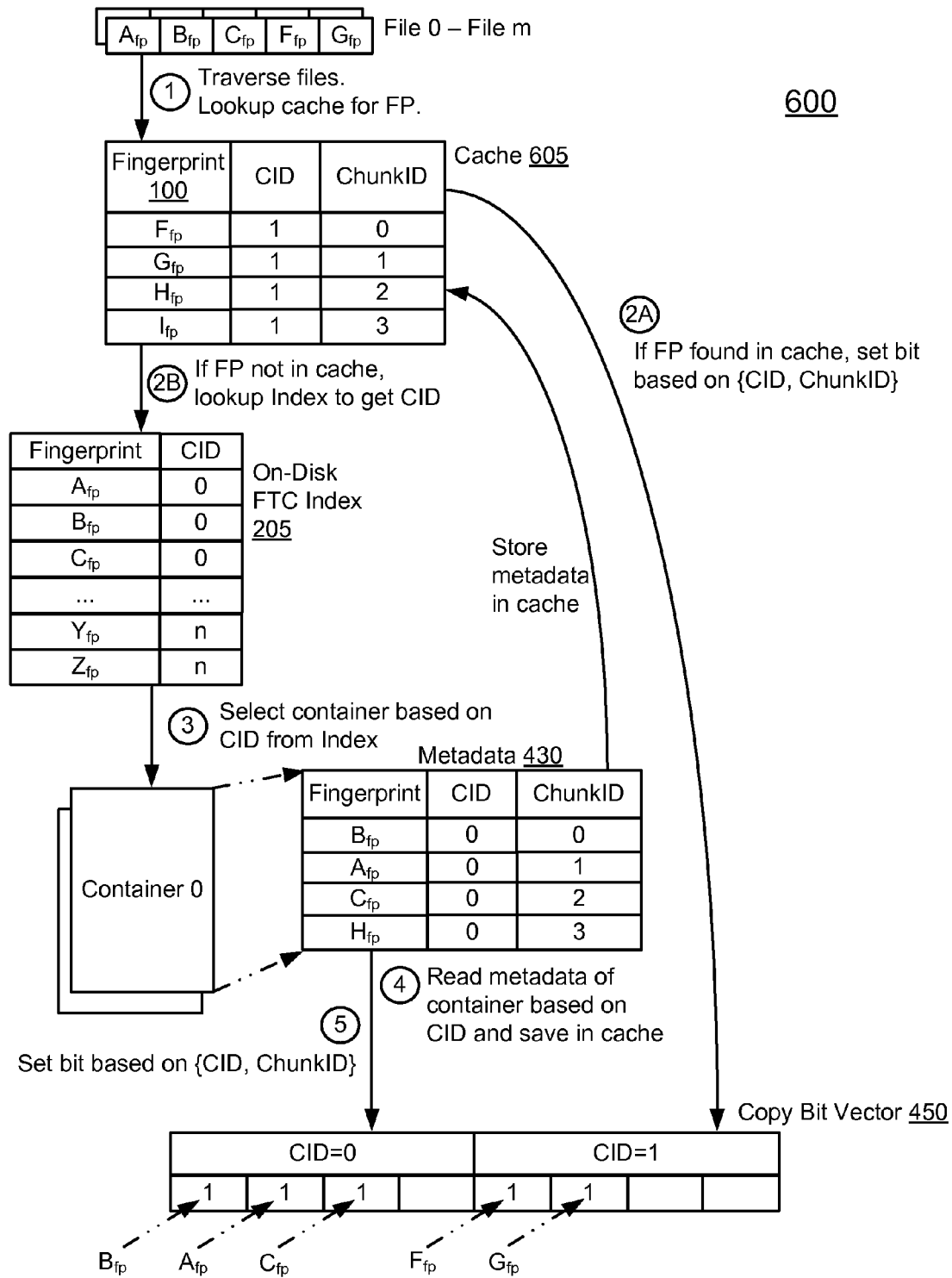
FIG. 6 is a processing diagram illustrating a method of sanitizing a storage system according to one embodiment of the invention.

FIG. 6 is a processing diagram illustrating a method 600 of sanitizing a file system according to one embodiment. For example, method 600 may be performed by sanitizer 117 of FIG. 1. Method 600 creates a CBV, such as CBV 450 of FIG. 4, by leveraging off the locality of the data chunks through the use of a cache.

Referring now to FIG. 6, at operation 1, the sanitizer traverses the files, for example, file 0 and file m, of the file system. For each fingerprint that is found in a file, the sanitizer performs a lookup of cache 605 to determine if the metadata corresponding to the fingerprint is present. In one embodiment, cache 605 includes information of one or more data chunks in one or more containers. By way of example, as illustrated in FIG. 6, cache 605 includes fingerprints $F_{fp}$, $G_{fp}$, $H_{fp}$, and $I_{fp}$, which represent the data chunks F, G, H, and I, respectively. In one embodiment, cache 605 also includes the corresponding CIDs and chunk IDs of the fingerprints. As illustrated in FIG. 6, cache 605 provides metadata indicating that data chunks F, G, H, and I are stored in container 1 (as indicated by CID=1), at chunk locations 0, 1, 2, and 3, respectively (as indicated by chunk ID=0, 1, 2, 3, respectively). Although cache 605 is illustrated as including metadata of one container, it will be appreciated that cache 605 is not so limited. For example, cache 605 may include metadata of more than one container, which may or may not be contiguous (e.g., there may be a gap in the CIDs).

At operation 2A, the sanitizer determines that the fingerprint is included in cache 605, and obtains the corresponding CID and chunk ID of the fingerprint from the cache. In one embodiment, the sanitizer updates a bit in CBV 450 to indicate the data chunk represented by the fingerprint is live. According to one aspect of the invention, the bit in CBV 450 which is updated is the bit corresponding to the CID and chunk ID obtained from cache 605. For example, CBV 450 may be implemented as a data structure (such as an array of bits), such that each bit in the data structure represents the live status of a data chunk stored at a particular chunk location within a particular container. According to such an embodiment, a bit in the data structure is referenced by an index, which may be made up of a pair of {CID and chunk ID}.

At operation 2B, the sanitizer determines that the fingerprint is not included in cache 605, and performs a lookup of FTC index 205 based on the fingerprint to determine the CID of the container which contains the data chunk represented by the fingerprint. At operation 3, the sanitizer uses the CID resulting from the FTC index 205 lookup to select the corresponding container which contains the data chunk represented by the fingerprint.

At operation 4, the sanitizer reads the metadata of the container selected at operation 3. In one embodiment, the metadata of each container includes the fingerprints of all the data chunks stored in the container, and their corresponding CIDs and chunk IDs. For example, as illustrated in FIG. 6, container 0 includes metadata 430, which includes fingerprints $B_{fp}$, $A_{fp}$, $C_{fp}$, and $H_{fp}$, representing data chunks B, A, C, and H, respectively, each having the CID value of 0 to identify container 0 as the container which stores the chunks. Moreover, metadata 430 includes chunk IDs indicating data chunks B, A, C, and H are stored at chunk locations 0, 1, 2, and 3, respectively (as indicated by chunk ID=0, 1, 2, 3, respectively). In one embodiment, at operation 4, the sanitizer obtains the CID and chunk ID corresponding to the fingerprint from the read metadata.

In one embodiment, the sanitizer stores the read metadata in cache 605, which may be leveraged by the sanitizer in processing the next fingerprint in the file. For instance, by storing the metadata of the container in cache 605, and assuming the files have a low fragmentation rate, i.e., many data chunks within the file are mostly stored in the same container, the sanitizer may be able to skip one or more FTC index lookups at operation 2B. In one embodiment, if cache 605 is full, a cache eviction policy may be applied to determine if data currently cached on cache 605 may be evicted to make room for the read metadata.

At operation 5, the sanitizer uses the CID and chunk ID obtained at operation 4 to reference and update a bit within CBV 450 to indicate the corresponding chunk stored at the location identified by the pair {CID, chunk ID} is live.

The above operations may be further clarified by way of example, using the configurations as illustrated in FIG. 6. At operation 1, when the sanitizer traverses file 0 and finds fingerprint $A_{fp}$, it concludes that the fingerprint is not present in cache 605. As a result, the sanitizer proceeds to operation 2B and performs a lookup of FTC index 205 to obtain CID 0. At operation 3, the sanitizer selects container 0 based on the obtained CID 0, and reads its metadata 430 at operation 4 to obtain the pair {CID=0, chunk ID=1} representing the location of data chunk A in container 0. The sanitizer further stores the read metadata in cache 605. At operation 5, the sanitizer uses the pair {CID=0, chunk ID=1} to reference a bit in CBV 450 that represents the live status of chunk A, and sets it to "1", indicating the chunk is live. In one embodiment, the pair is mapped to the CBV bit by looking up a table preconfigured in memory. In such an embodiment, the table contains a listing/mapping of each CID to a memory address corresponding to the starting location of the container identified by the CID. The chunk ID is then used as an offset from the starting location to determine the CBV bit corresponding to the pair {CID, chunk ID}. Continuing on with the example, the sanitizer performs similar operations for fingerprints $B_{fp}$ and $C_{fp}$, which are now in the cache and can be found without a FTC lookup. However, when the sanitizer finds fingerprint $F_{fp}$ in the file, it determines that the fingerprint is present in cache 605, and obtains the pair {CID=1, and chunk ID=0} from the cache. As a result, at operation 2A, the sanitizer uses the pair {CID=1, chunk ID=0} to reference a bit in CBV 450 that represents the live status of chunk F, and sets it to "1", indicating the chunk is live.

Figure 7:
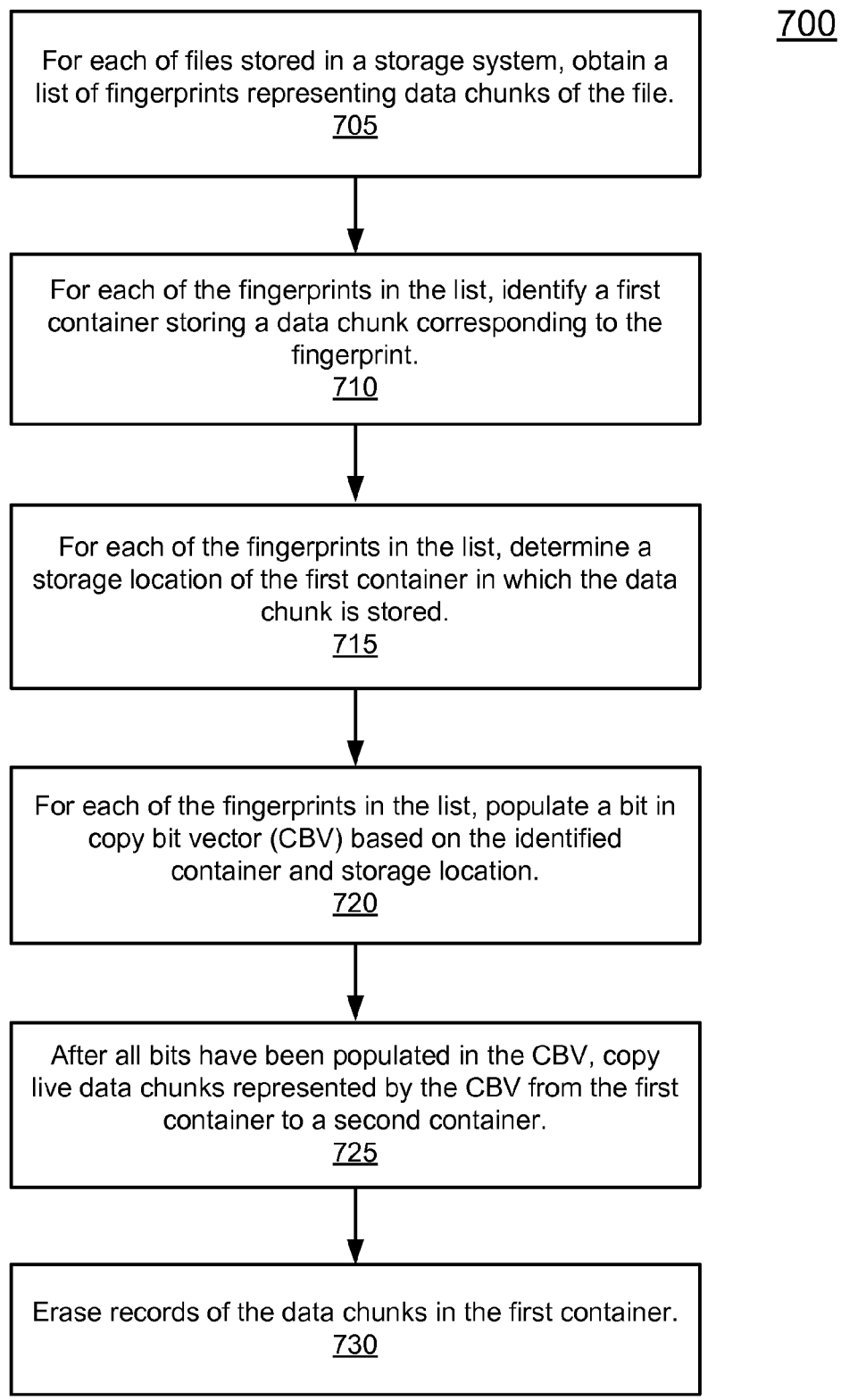
FIG. 7 is a flow diagram illustrating a method of sanitizing a storage system according to one embodiment of the invention.

FIG. 7 is a flow diagram illustrating a method 700 of sanitizing a file system according to one embodiment of the invention. For example, method 700 may be performed by sanitizer 117 of FIG. 1. Referring now to FIG. 7, at block 705, for each of a plurality of files stored in a storage system, the sanitizer obtains a list of fingerprints representing data chunks of the file. For example, the sanitizer traverses/reads the files of the storage system as described in the text relating to operation 1 of FIG. 6.

At block 710, for each of the fingerprints in the list obtained at block 705, the sanitizer identifies a first container storing a data chunk corresponding to the fingerprint. For example, the sanitizer identifies the CID of the fingerprint by performing a lookup operation of cache 605 as described in the text relating to operation 1 of FIG. 6. In one embodiment, if the cache lookup operation does not produce a CID of the fingerprint, the sanitizer identifies the first container storing a data chunk corresponding to the fingerprint by performing a lookup operation on an index, such as FTC index 205, as described in the text relating to operation 2B of FIG. 6.

At block 715, for each of the fingerprints in the list obtained at block 705, the sanitizer determines a storage location of the first container in which the data chunk is stored. For example, the sanitizer performs a lookup operation of cache 605 to obtain the chunk ID as described in the text relating to operation 1 of FIG. 6. In one embodiment, if the cache lookup operation does not result in a chunk ID of the storage location, the sanitizer determines the storage location by performing a lookup operation of an index, such as FTC index 205, as described in the text relating to operation 2B of FIG. 6, to obtain a CID. In such an embodiment, the sanitizer reads the metadata, such as metadata 430, corresponding to the CID, as described in the text relating to operations 3 and 4 of FIG. 6. According to one aspect of the invention, the metadata includes the chunk ID that identifies the storage location in the first container in which the data chunk corresponding to the fingerprint is stored.

At block 720, for each of the fingerprints in the list obtained at block 705, the sanitizer populates a bit in a copy bit vector based on the identified container and the storage location. For example, the sanitizer populates a bit in CBV 450 of FIG. 6, as described in the text relating to operation 2A and/or operation 5 of FIG. 6. In one embodiment, the copy bit vector, such as CBV 450 of FIG. 6, includes a plurality of bits and each storing a bit value indicating whether a data chunk is to be copied.

At block 725, after all of the bits corresponding to the fingerprints in the plurality of files in the storage system have been populated in the CBV, the sanitizer copies live data chunks represented by the CBV from the first container to a second container. For example, the sanitizer performs the operations of the copy phase as described above in the text relating to block 320 of FIG. 3. In one embodiment, the CBV is stored on disk. In another embodiment, the CBV is stored in memory. At block 730, the sanitizer erases records of the data chunks in the first container. For example, the sanitizer performs the operations of the zero phase as described above in the text relating to block 325 of FIG. 3.

The above discussion of the use of the CBV to perform sanitization may assume the file system is in read-only mode while the CBV is being built. The following description will discuss embodiments of the invention that enable sanitization of file systems in read-write mode.

In one embodiment, sanitization may be performed on a read-write file system by disabling (turning off) deduplication while the CBV is being built. According to one embodiment, existing containers of a storage system are immutable once they are written to disk. Hence, when new data chunks are written to disk, they get written out in new containers, i.e., beyond the range that was recorded during the analysis phase. However, an existing chunk which has been previously deleted may be resurrected by a reference from a new file. Thus, by turning off deduplication during a sanitization process, it can be guaranteed that new incoming chunks are written to containers that are outside the range of containers considered for the current sanitization cycle. As a result, during the copy phase, it can be guaranteed that, with deduplication turned off, data chunks will not be accidentally deleted, because no new data chunks are written to a container and no chunks will be revived in a previous container that may have already been processed by the sanitizer. In one embodiment, the range of containers considered for a given sanitization cycle is recorded as part of the analysis phase discussed above.

Figure 8:
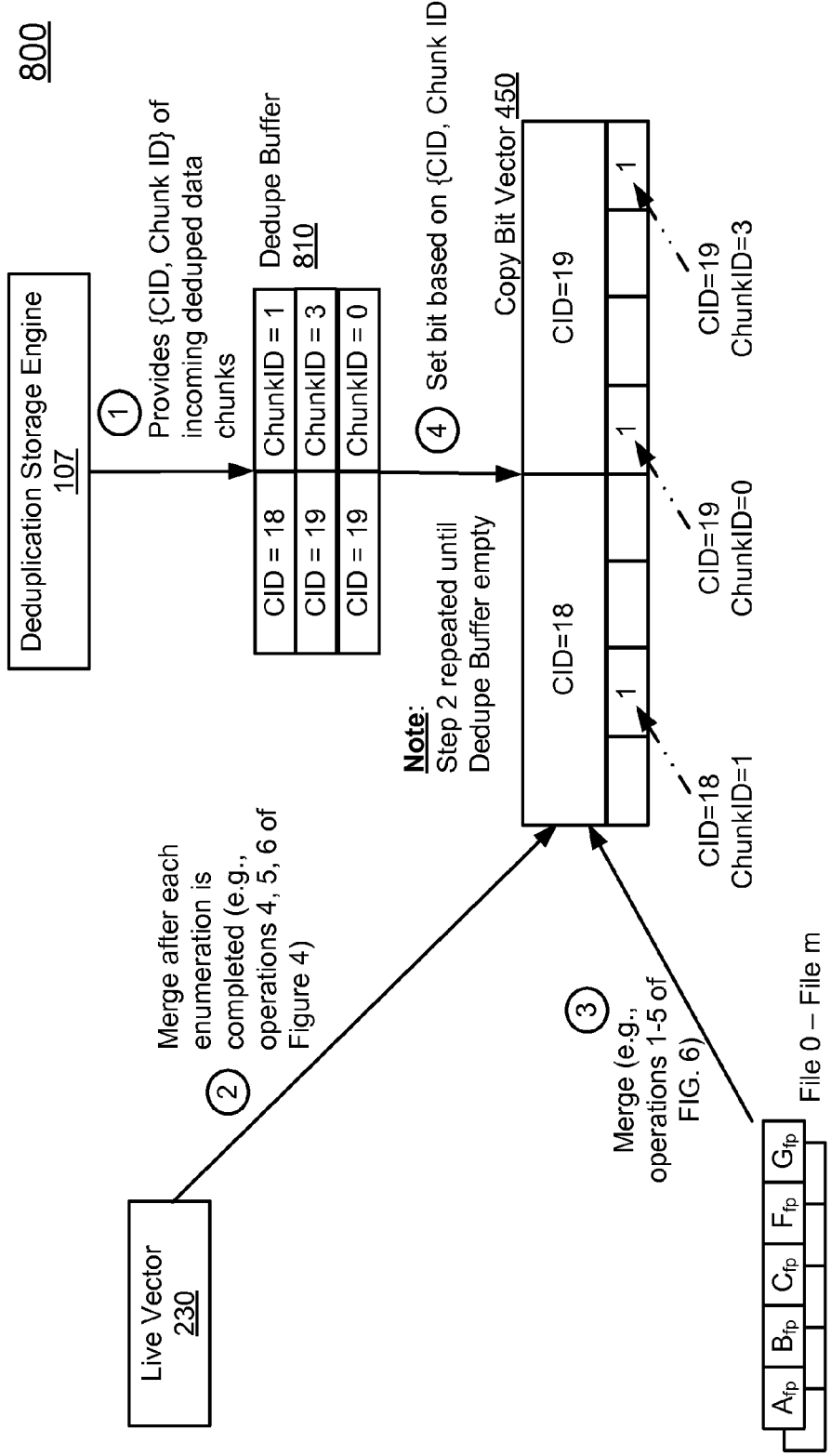
FIG. 8 is a processing diagram illustrating a method of sanitizing a storage system according to one embodiment of the invention.

FIG. 8 is a processing diagram illustrating a method 800 of sanitizing a file system according to another embodiment. For example, method 800 may be performed by sanitizer 117 of FIG. 1. Referring now to FIG. 8, at operation 1, deduplication storage engine (DSE) 107 deduplicates data chunks of a file that is written to the file system after sanitization has started. In one embodiment, DSE 107 provides the CIDs and chunk IDs of incoming deduped data chunks, which are stored in dedupe buffer 810.

At operation 2, when live vector 230 is built, the sanitizer merges it with CBV 450. In one embodiment, "merging" of live vector 230 means scanning metadata of check-pointed containers, looking up the built live vector, and marking the live status bits of CBV 450 accordingly. For example, live vector 230 may be merged with CBV 450 using operations similar to operations 4 through 6 of method 400 illustrated in FIG. 4.

At operation 3, the sanitizer merges the fingerprints found in the files, such as file 0 and file m of the file system, into CBV 450. In one embodiment, "merging" of files with 450 means enumerating the files, scanning the metadata of check-pointed containers, and marking the live status bits of CBV 455 accordingly. For example, the files may be merged with CBV 450 using operations similar to operations 1 through 5 of method 600 illustrated in FIG. 6. FIG. 8 illustrates method 800 as having operations 2 and 3. However, it will be appreciated that in some embodiments, only operation 2 or operation 3 is performed, not both.

At operation 4, according to one embodiment, the pairs of {CID, chunk ID} buffered in dedupe buffer 810 are merged with CBV 450. In one embodiment, CBV 450 may be implemented as a data structure (such as an array of bits) discussed above. In one embodiment, "merging" dedupe buffer 810 with CBV 450 means that the pairs of {CID, chunk ID} buffered in dedupe buffer 810 are used as indexes referencing bits of CBV 450. In such an embodiment, the referenced bits in CBV 450 are set to "1" indicating the incoming chunks are live.

In some embodiments, while live vector 230 or files 0-m are being merged with CBV 450, dedupe buffer 810 may become completely full, and further deduplication of chunks may result in a corrupted file system, for example because incoming deduped data chunks may be revived in a container already slated for sanitization with vector 450 completed. Or chunks may be written to containers that have already been processed by the sanitizer for the current iteration. By way of example, suppose that the sanitizer has started merging live vector 230 at operation 2, and that the sanitizer has already processed container 10 by setting the bits in the CBV corresponding to container 10. Supposed further that DSE 107 determines that an incoming chunk is a duplicate of a chunk in container 5, at chunk location 0, which the sanitizer has already determined to be a dead chunk in the current sanitization iteration but not copied forward yet. In such a case, the chunk in container 5, chunk ID 0 will be accidentally treated as dead, thus resulting in a corrupted file system. In order to avoid corrupting the file system, in one embodiment, deduplication is turned off once dedupe buffer 810 is full, thus forcing DSE 107 to write new incoming chunks to containers that are guaranteed to be beyond the range of containers of the current sanitization iteration.

In one embodiment, to minimize the window during which deduplication is turned off, dedupe buffer 810 may be merged at a predetermined threshold before it becomes completely full. For instance, operation 4 may be performed before dedupe 810 becomes full. Accordingly, in some embodiments, operations 2, and/or 3, and/or 4 of FIG. 8 may be performed in parallel. Moreover, it should be appreciated that operations 2 and/or 3, and/or 4 may be performed out of order. For example, if dedupe buffer 810 reaches a predetermined threshold, or becomes full, before live vector 230 is ready to be merged, dedupe buffer 810 may be merged first, and live vector 230 may be merged when it becomes ready. Note that a new file may "revive" a dead data chunk because now the newly received file may have a reference to a data chunk previously marked dead. By marking in the copy bit vector 450 for the data chunk, the previously dead data chunk becomes live and it will be copied over to a new container.

FIG. 8 illustrates dedupe buffer 810 storing three pairs of {CID, chunk ID}. It will be appreciated that dedupe buffer 810 is not limited to a depth of three pairs. In some embodiments, dedupe buffer 810 may store less than three pairs of {CID, chunk ID}. Yet in other embodiments, dedupe buffer 810 may store more than three pairs of {CID, chunk ID}. It will be further appreciated that dedupe buffer 810 is not limited to storing CIDs and chunk IDs of the incoming chunks. In one embodiment, dedupe buffer may store less information. In other embodiments, dedupe buffer 810 may store more information.

According to one embodiment of the invention, instead of maintaining live status bits of data chunks in a separate bit vector such as CBV 450, the live status bits of the data chunks are included as part of an index, for example, by extending FTC index 205 to include these live status bits.

Figure 9:
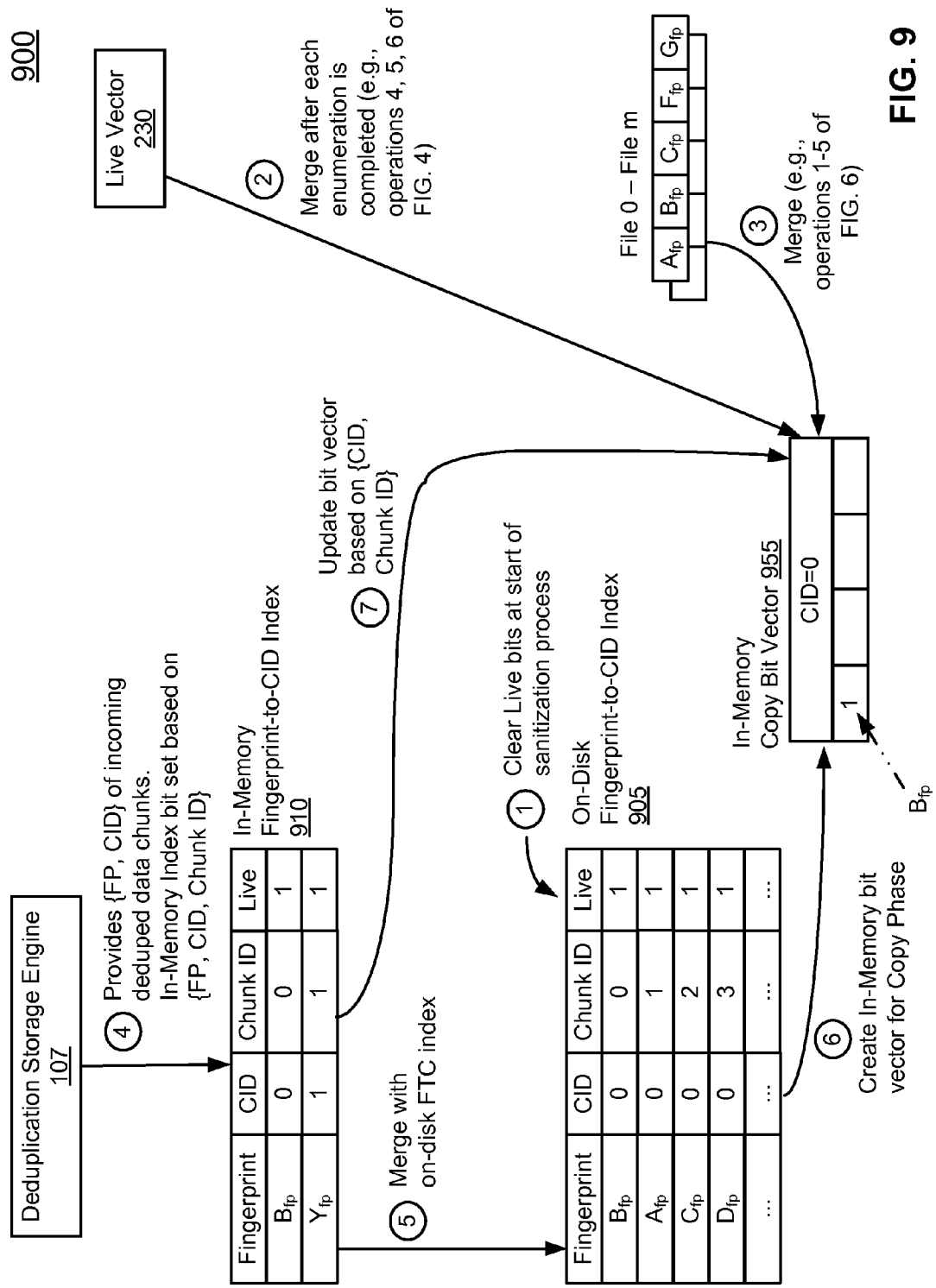
FIG. 9 is a processing diagram illustrating a method of sanitizing a storage system according to one embodiment of the invention.

FIG. 9 is a processing diagram illustrating a method 900 of sanitizing a file system according to one embodiment. For example, method 900 may be performed by sanitizer 117 of FIG. 1. According to this embodiment, FTC index 905 is maintained, which is similar to FTC index 205 previously discussed, except it is modified/extended to include live status bits of data chunks in the system. For instance, FTC index 905 may be extended to include CBV 450 of FIGS. 4 and 6. In one embodiment, FTC index 905 is further extended to include the corresponding chunk IDs of the fingerprints in the index.

Referring now to FIG. 9, at operation 1, the sanitizer clears the live status bits of FTC index 905 to indicate the start of a sanitization process. This ensures that the live status bits set by the previous sanitization process are not accidentally treated as live status of the current sanitization process. For example, the live status bits may be cleared to indicate the data chunks are dead.

At operation 2, when live vector 230 is built, the sanitizer merges it with CBV 955. In one embodiment, "merging" of live vector 230 means scanning metadata of check-pointed containers, looking up the built live vector, and marking the live status bits of CBV 955 accordingly. For example, live vector 230 may be merged with CBV 955 using operations similar to operations 4 through 6 of method 400 illustrated in FIG. 4.

At operation 3, the sanitizer merges the fingerprints found in the files, such as file 0 and file m of the file system, into CBV 955. In one embodiment, "merging" of files with CBV 955 means enumerating the files, scanning the metadata of check-pointed containers, and marking the live status bits of CBV 955 accordingly. For example, the files may be merged with CBV 955 using operations similar to operations 1 through 5 of method 600 illustrated in FIG. 6. FIG. 9 illustrates method 900 as having operation 2 and 3. However, it will be appreciated that in some embodiments, only operation 2 or operation 3 is performed, not both.

At operation 4, in one embodiment, while CBV 955 is being built, for example by merging live vector 230 (operation 2) or merging the files (operation 3), there may be incoming data chunks that are deduped by DSE 107. In some cases, these deduped data chunks may corrupt the file system if DSE 107 references deduplicates them against containers that have been processed. In other words, if incoming chunks deduplicate against container chunk locations that the sanitizer has already marked as dead for this iteration, the incoming chunk may be lost and the file system is corrupted. During operation 4, in order to avoid corrupting file system, in one embodiment, the sanitizer buffers in FTC index 910 the corresponding metadata of the incoming deduped chunks provided, e.g., by DSE 107. In one embodiment, the metadata includes, but is not limited to, the fingerprint representing the incoming chunk, the CID and chunk ID identifying the location where the chunk is stored, and a live status bit indicating the chunk is live.

At operation 5, in one embodiment, when FTC index 910 reaches a predetermined threshold, e.g., when it is full, the sanitizer merges FTC index 910 with FTC index 905. In one embodiment, "merging" means that the same information in FTC index 910 is mirrored in FTC index 905, for example, by copying the data from FTC index 910 to FTC index 905.

As illustrated in FIG. 9, deduplication of data chunks by DSE 107 occur at operation 4, after live vector 230 or files are merged at operation 2 or 3, respectively. However, it will be appreciated that these operations may be performed out of order, or in parallel. For example, deduplication of data chunks by DSE 107 may occur before or in parallel with the merging of live vector 230 or files 0 and m.

As illustrated in FIG. 9, FTC index 910 is merged with FTC index 905 after live vector 230 or files 0-m have been merged with FTC index 905. However, it will be appreciated that method 900 is not so limited. For example, in some embodiments, if FTC index 910 reaches a predetermined threshold before live vector 230 is ready for merging, FTC index 910 may be merge first, and live vector 230 is merged once it becomes ready. It should also be appreciated that the merging as described in operations 2, 3, and 5 may occur in parallel.

In one embodiment, after operation 2 and/or operation 3 and/or operation 4 and/or operation 5 have been performed, the result is a fingerprint-ordered FTC index 905. In one embodiment, it is desirable to represent the fingerprint-ordered index in a CID-ordered format so that it is more optimized for the copy phase. In one embodiment, this format conversion may be achieved by building an in-memory bit vector such as CBV 955, at operation 6.

At operation 6, in one embodiment, the sanitizer scans FTC index 905 and for every chunk marked live, update the bit that corresponds to the pair {CID, chunk ID} of the live fingerprint in CBV 955. In one embodiment, CBV 955 is implemented as a data structure of bits, and referenced by an index, similar to CBV 450. In one embodiment, in-memory CBV 955 is used by the copy phase and zero phase to complete the sanitization process.

While in-memory CBV 955 is being created based on FTC index 905, incoming deduped data chunks may be written to the file system. As discussed above, if DSE 107 deduplicates an incoming chunk against a chunk location that has already been processed by the sanitizer, the file system may become corrupted because the new chunk may be erroneously treated as a dead chunk.

In one embodiment, in order to avoid corrupting the file system due to incoming data chunks, the file system may be set to read-only mode, i.e., no new data chunks may be written to the system. Although this embodiment prevents the sanitizer from corrupting the file system, disabling the write mode of the file system is not ideal.

In another embodiment, in order to avoid corrupting the file system due to incoming data chunks, the sanitizer may disable deduplication while in-memory CBV 955 is being built. This forces incoming chunks to be written to a container that is beyond the container range of the current sanitization iteration. Although disabling deduplication is less draconian than disabling the write mode all together, it is also not ideal either.

In yet another embodiment, the sanitizer may leverage off a buffer such as FTC index 910, for example, by storing the metadata of incoming chunks, similar to operation 4 discussed above, which is then merged with CBV 955 at operation 7. For example, if the sanitizer determines that the pair of {CID, Chunk ID} in FTC index 910 is represented by CBV 955, the sanitizer may update the corresponding bit in CBV 955 to indicate that the incoming chunk is live. However, if the sanitizer determines that CBV 955 does not include the bits that represent the pair of {CID, Chunk ID} in FTC index 910, the sanitizer is not able to update CBV 955. In such an embodiment, the pair of {CID, Chunk ID} would have to be merged with CBV 955 once the bit corresponding to the pair has been loaded into memory, for example by setting the bit to "1" to indicate it is live.

By way of example, as illustrated in FIG. 9, after FTC index 905 has been built for the current sanitization iteration, the sanitizer has loaded into memory CBV 955 with only the bits representing chunk ID=0, 1, 2, and 3 of CID 0 (operation 6). Next, DSE 107 deduplicates incoming chunk B and references chunk location 0, of container 0. DSE 107 then deduplicates incoming chunk Y and references chunk location 1 of container 1. The corresponding metadata is then stored in FTC index 910 (similar to operation 4). At operation 7, the sanitizer processes metadata corresponding to chunk B, and determines that it is represented by the pair {CID=0, Chunk ID=0}, and that the pair is represented by the CBV 955 bits that have been loaded into memory. As a result, the sanitizer sets the corresponding bit (e.g., the bit at position 0 of CBV 955) to "1", indicating chunk B is live. However, when the sanitizer processes the next fingerprint in FTC index 910, it determines that the pair {CID=1, Chunk ID=1} is not yet represented by CBV 955. As a result, in one embodiment, an unrepresented pair may be saved in a log (e.g., a dedicated memory portion). Once the CBV bits corresponding to the unrepresented pair have been loaded into memory, the log may be traversed/processed, and the CBV bits may be updated based on the pairs stored in the log. In one embodiment, the log may be flushed and stored onto disk if the dedicated memory portion becomes full.

Figure 10:
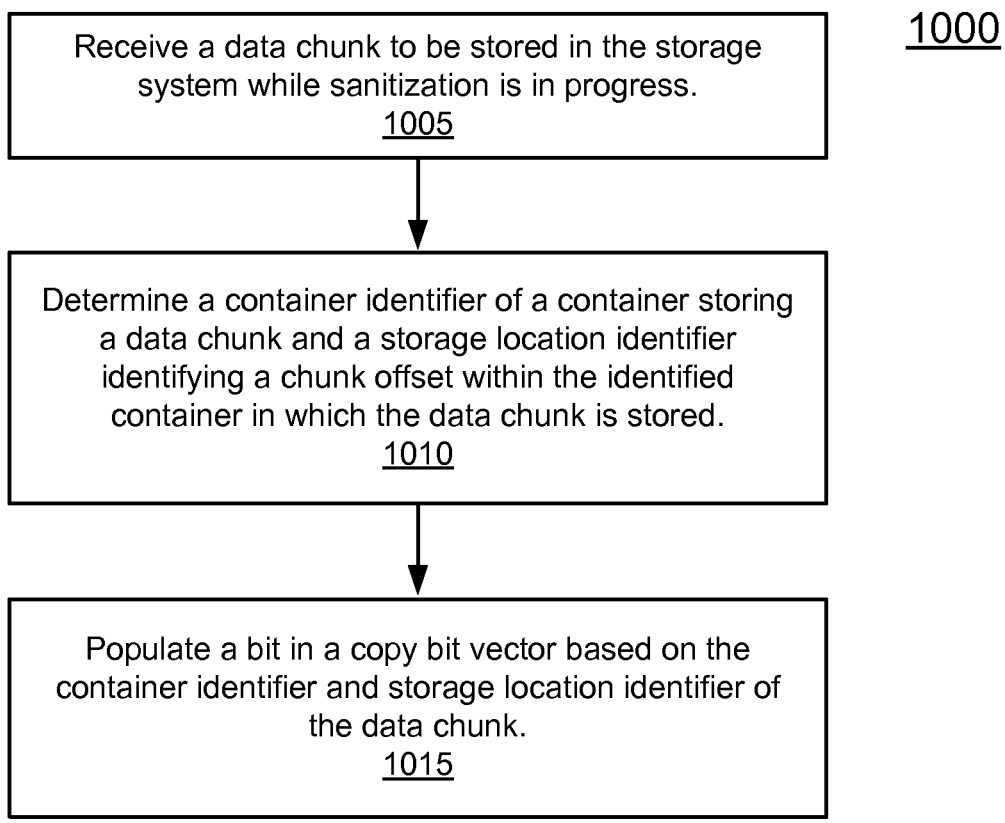
FIG. 10 is a flow diagram illustrating a method of sanitizing a storage system according to one embodiment of the invention.

FIG. 10 is a flow diagram illustrating a method 1000 of sanitizing a storage system according to one embodiment of the invention. For example, method 1000 may be performed by sanitizer 117 and/or deduplication storage engine (DSE) 107 of FIG. 1. Referring now to FIG. 10, at block 1005, the DSE receives a data chunk to be stored in the storage system while a sanitization process is in progress. For example, the DSE performs operation 1 of FIG. 8 and/or operation 4 of FIG. 9.

At block 1010, the sanitizer determines a container identifier of a container storing the data chunk and a storage location identifier identifying a chunk offset within the identified container in which the data chunk is stored. For example, the sanitizer accesses deduplication buffer 810 of FIG. 8 and/or FTC index 910 of FIG. 9 to obtain the CID and chunk ID of the corresponding fingerprint that represents the data chunk.

At block 1015, the sanitizer populates a bit in a copy bit vector based on the container identifier and storage location identifier of the data chunk. For example, the sanitizer populates CBV 450 and/or CBV 955 using the pair {CID, chunk ID}, as described in the text relating to operation 4 and operation 7 of FIGS. 8 and 9, respectively.

Throughout the discussion above, a live status of "1" indicates the corresponding data chunk is live. However, it will be appreciated that any predetermined value may be used in a consistent manner to indicate that a data chunk is live. For example, a value of "0" may be used to indicate that a data chunk is live. Moreover, multiple bits may be used to represent the live status of data chunks, thus allowing values other than "0" or "1" to be used to represent the liveness of data chunks.

Throughout the description of various embodiments of the present invention, the sanitization process is described as a series of operations. In will be appreciated, however, that in methods described above, not all operations described are required, e.g., some operations may be performed while others are not. Moreover, where operations are performed, they may be performed out of order, e.g., not in the sequential order that has been described. It will be further appreciated that some or all of the operations may be performed in parallel, which may be performed by one or more sets of logic within the sanitizer, which may be implemented in hardware, software, firmware, or any combination thereof.

FIG. 11 is a block diagram illustrating a chunk storage engine according to one embodiment of the invention. For example, deduplication storage engine 1100 may be implemented as part of a deduplication storage system as described above, such as deduplication storage engine 107 of FIG. 1. Referring to FIG. 11, in one embodiment, deduplication storage engine 1100 includes file service interface 1102, segmenter 1104, duplicate eliminator 1106, file system control 1108, and storage unit interface 1112. Deduplication storage engine 1100 receives a file or files (or data item(s)) via file service interface 1102, which may be part of a file system namespace of a file system associated with the deduplication storage engine 1100. The file system namespace refers to the way files are identified and organized in the system. An example is to organize the files hierarchically into directories or folders. File service interface 1112 supports a variety of protocols, including a network file system (NFS), a common Internet file system (CIFS), and a virtual tape library interface (VTL), etc.

The file(s) is/are processed by segmenter 1104 and file system control 1108. Segmenter 1104 breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1108 processes information to indicate the chunk(s) association with a file. In some embodiments, a list of fingerprints is used to indicate chunk(s) associated with a file. File system control 1108 passes chunk association information (e.g., representative data such as a fingerprint) to an index (not shown). The index is used to locate stored chunks in storage units 1110 via storage unit interface 1112. Duplicate eliminator 1106 identifies whether a newly received chunk has already been stored in storage units 1110. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1110 that make up the file. Chunks are then packed by a container manager (not shown) into one or more storage containers stored in storage units 1110. The deduplicated chunks may be further compressed using a variation of compression algorithms, such as a Lempel-Ziv algorithm before being stored.

When a file is to be retrieved, file service interface 1102 is configured to communicate with file system control 1108 to identify appropriate chunks stored in storage units 1110 via storage unit interface 1112. Storage unit interface 1112 may be implemented as part of a container manager. File system control 1108 communicates with an index (not shown) to locate appropriate chunks stored in storage units via storage unit interface 1112. Appropriate chunks are retrieved from the associated containers via the container manager and are used to construct the requested file. The file is provided via interface 1102 in response to the request. In one embodiment, file system control 1108 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for sanitizing a storage system, the method comprising:
   for each of a plurality of files stored in a file system of the storage system,
      obtaining a list of fingerprints representing data chunks of the file from a checkpointed on disk fingerprint-to-container (FTC) index, wherein the data chunks are deduplicated data chunks, and wherein at least one data chunk is referenced by multiple files in the file system;
   for each of the fingerprints,
      performing a lookup operation based on the fingerprint in a cache storing a plurality of cache entries, each mapping a fingerprint to a container identifier (ID) storing the corresponding data chunk and a chunk ID indicating a storage location of the data chunk within the container;
      identifying a first container ID identifying a first container storing a data chunk corresponding to the fingerprint from a first cache entry matching the fingerprint,
      determining from the first cache entry a first chunk ID identifying a storage location of the first container in which the data chunk is stored, and
      in response to determining that the fingerprint is not found in the cache:
         looking up the fingerprint in the FTC index to identify the first container ID storing the corresponding data chunk represented by the fingerprint;
         reading, into the cache, metadata of the first container having the first container ID; and
         looking up the first chunk ID, using the fingerprint, in the metadata of the first container having the first container ID;
      populating a bit in a copy bit vector (CBV) based on the first container ID and the first chunk ID, the CBV including a plurality of bits and each storing a bit value indicating whether a data chunk is to be copied, wherein a data chunk with a corresponding bit having a predetermined bit value in the CBV is a live data chunk, wherein a live data chunk is referenced by at least one of the files in the file system;
   after all of the bits corresponding to the fingerprints in the plurality of files have been populated in the CBV, copying live data chunks represented by the CBV from
the first container to a second container; and
erasing records of the data chunks in the first container
after the live data chunks of the first container indicated
by the CBV have been copied to the second container
to reclaim a storage space associated with the first
container, including padding a predetermined data
value in the first container, and releasing the first
container back to a pool of free containers for future
reuse.

2. The method of claim 1, wherein performing a lookup operation in a cache comprises:
performing a lookup operation in an index based on the fingerprint to identify the first container; and
reading a metadata corresponding to the identified first container to determine the storage location, if the first container and storage location cannot be identified by the lookup operation in the cache.

3. The method of claim 2, further comprising storing the metadata obtained from the first container in the cache, the metadata including the fingerprint, a container identifier identifying the container storing the data chunk corresponding to the fingerprint, and a storage location identifier identifying a chunk offset within the identified container in which the data chunk is stored.

4. The method of claim 2, further comprising:
receiving a data chunk to be stored in the storage system while sanitization is in progress;
storing, in a buffer, a container identifier of a container storing the data chunk and a storage location identifier identifying a chunk offset within the identified container in which the data chunk is stored; and
populating a bit in the CBV based on the container identifier and storage location identifier stored in the buffer.

5. The method of claim 2, wherein the CBV is included in a container index that maps a fingerprint of a data chunk to a container storing the data chunk, wherein each of the bits in the CBV is set, at the start of the sanitization process, to a predetermined value indicating the corresponding data chunk is dead, and wherein a dead data chunk is not referenced by any of the files in the file system.

6. The method of claim 1, wherein data chunks are copied from the first container to a second container if the first container contains at least one dead data chunk.

7. The method of claim 1, wherein deduplication is disabled during the sanitization process.

8. A non-transitory computer-readable medium having instructions stored therein, which when executed by a computer, cause the computer to perform operations, the operations comprising:
for each of a plurality of files stored in a file system of the storage system,
obtaining a list of fingerprints representing data chunks of the file from a checkpointed on disk fingerprint-to-container (FTC) index, wherein the data chunks are deduplicated data chunks, and wherein at least one data chunk is referenced by multiple files in the file system;
for each of the fingerprints,
performing a lookup operation based on the fingerprint in a cache storing a plurality of cache entries, each mapping a fingerprint to a container identifier (ID) storing the corresponding data chunk and a chunk ID indicating a storage location of the data chunk within the container,
identifying a first container ID identifying a first container storing a data chunk corresponding to the fingerprint from a first cache entry matching the fingerprint,
determining from the first cache entry a first chunk ID identifying a storage location of the first container in which the data chunk is stored, and
in response to determining that the fingerprint is not found in the cache:
looking UP fingerprint in the FTC index to identify the first container ID storing the corresponding data chunk represented by the fingerprint;
reading, into the cache, metadata of the first container having the first container ID; and
looking UP the first chunk ID, using the fingerprint, in the metadata of the first container having the first container ID;
populating a bit in a copy bit vector (CBV) based on the first container ID and the first chunk ID, the CBV including a plurality of bits and each storing a bit value indicating whether a data chunk is to be copied, wherein a data chunk with a corresponding bit having a predetermined bit value in the CBV is a live data chunk, wherein a live data chunk is referenced by at least one of the files in the file system;
after all of the bits corresponding to the fingerprints in the plurality of files have been populated in the CBV, copying live data chunks represented by the CBV from the first container to a second container; and
erasing records of the data chunks in the first container after the live data chunks of the first container indicated by the CBV have been copied to the second container to reclaim a storage space associated with the first container, including padding a predetermined data value in the first container, and releasing the first container back to a pool of free containers for future reuse.

9. The non-transitory computer-readable medium of claim 8, wherein performing a lookup operation in a cache comprises:
performing a lookup operation in an index based on the fingerprint to identify the first container; and
reading a metadata corresponding to the identified first container to determine the storage location, if the first container and storage location cannot be identified by the lookup operation in the cache.

10. The non-transitory computer-readable medium of claim 9, wherein the operations further comprise storing the metadata obtained from the first container in the cache, the metadata including the fingerprint, a container identifier identifying the container storing the data chunk corresponding to the fingerprint, and a storage location identifier identifying a chunk offset within the identified container in which the data chunk is stored.

11. The non-transitory computer-readable medium of claim 9, wherein the operations further comprise:
receiving a data chunk to be stored in the storage system while sanitization is in progress;
storing, in a buffer, a container identifier of a container storing the data chunk and a storage location identifier identifying a chunk offset within the identified container in which the data chunk is stored; and
populating a bit in the CBV based on the container identifier and storage location identifier stored in the buffer.

12. The non-transitory computer-readable medium of claim 9, wherein the CBV is included in a container index that maps a fingerprint of a data chunk to a container storing the data chunk, and wherein each of the bits in the CBV is set, at the start of the sanitization process, to a predetermined value indicating the corresponding data chunk is dead, and wherein a dead data chunk is not referenced by any of the files in the file system.

13. The non-transitory computer-readable medium of claim 8, wherein data chunks are copied from the first container to the second container if the first container contains at least one dead data chunk.

14. The non-transitory computer-readable medium of claim 8, wherein deduplication is disabled during the sanitization process.

15. A data processing system, comprising:
a processor; and
a memory to store instructions, which when executed from the memory, cause the processor to perform operations, the operations including for each of a plurality of files stored in a file system of the storage system,
obtaining a list of fingerprints representing data chunks of the file from a checkpointed on disk fingerprint-to-container (FTC) index, wherein the data chunks are deduplicated data chunks, and wherein at least one data chunk is referenced by multiple files in the file system;
for each of the fingerprints,
performing a lookup operation based on the fingerprint in a cache storing a plurality of cache entries, each mapping a fingerprint to a container identifier (ID) storing the corresponding data chunk and a chunk ID indicating a storage location of the data chunk within the container,
identifying a first container ID identifying a first container storing a data chunk corresponding to the fingerprint from a first cache entry matching the fingerprint,
determining from the first cache entry a first chunk ID identifying a storage location of the first container in which the data chunk is stored, and
in response to determining that the fingerprint is not found in the cache:
looking UP the fingerprint in the FTC index to identify the first container ID storing the corresponding data chunk represented by the fingerprint;
reading, into the cache, metadata of the first container having the first container ID; and
looking UP the first chunk ID, using the fingerprint, in the metadata of the first container having the first container ID;
populating a bit in a copy bit vector (CBV) based on the first container ID and the first chunk ID, the CBV including a plurality of bits and each storing a bit value indicating whether a data chunk is to be copied, wherein a data chunk with a corresponding bit having a predetermined bit value in the CBV is a live data chunk, wherein a live data chunk is referenced by at least one of the files in the file system;
after all of the bits corresponding to the fingerprints in the plurality of files have been populated in the CBV, copying live data chunks represented by the CBV from the first container to a second container; and
erasing records of the data chunks in the first container after the live data chunks of the first container indicated by the CBV have been copied to the second container to reclaim a storage space associated with the first container, including padding a predetermined data value in the first container, and releasing the first container back to a pool of free containers for future reuse.

16. The system of claim 15, wherein performing a lookup operation in a cache comprises:
performing a lookup operation in an index based on the fingerprint to identify the first container; and
reading a metadata corresponding to the identified first container to determine the storage location, if the first container and storage location cannot be identified by the lookup operation in the cache.

17. The system of claim 16, wherein the operations further comprise storing, by the processor, the metadata obtained from the first container in the cache, the metadata including the fingerprint, a container identifier identifying the container storing the data chunk corresponding to the fingerprint, and a storage location identifier identifying a chunk offset within the identified container in which the data chunk is stored.

18. The system of claim 16, wherein the operations further comprise:
receiving, by the processor, a data chunk to be stored in the storage system while sanitization is in progress;
storing by the processor, in a buffer, a container identifier of a container storing the data chunk and a storage location identifier identifying a chunk offset within the identified container in which the data chunk is stored; and
populating by the processor, a bit in the CBV based on the container identifier and storage location identifier stored in the buffer.

19. The system of claim 16, wherein the CBV is included in a container index that maps a fingerprint of a data chunk to a container storing the data chunk, and wherein each of the bits in the CBV is set, at the start of the sanitization process, to a predetermined value indicating the corresponding data chunk is dead, and wherein a dead data chunk is not referenced by any of the files in the file system.

20. The system of claim 15, wherein data chunks are copied from the first container to the second container if the first container contains at least one dead data chunk.

21. The system of claim 15, wherein deduplication is disabled during the sanitization process.

* * * * *